US011567597B2

(12) United States Patent
Jun et al.

(10) Patent No.: US 11,567,597 B2
(45) Date of Patent: Jan. 31, 2023

(54) DISPLAY DEVICE AND DATA DRIVER

(71) Applicant: LG DISPLAY CO., LTD., Seoul (KR)

(72) Inventors: Jaehun Jun, Paju-si (KR); Hyunkyu Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/472,059

(22) Filed: Sep. 10, 2021

(65) Prior Publication Data

US 2021/0405799 A1    Dec. 30, 2021

Related U.S. Application Data

(63) Continuation of application No. 16/862,139, filed on Apr. 29, 2020, now Pat. No. 11,144,147.

(30) Foreign Application Priority Data

Apr. 30, 2019   (KR) .................. 10-2019-0050562

(51) Int. Cl.
*G06F 3/041* (2006.01)
*G06F 3/044* (2006.01)
*G09G 3/3275* (2016.01)

(52) U.S. Cl.
CPC .......... *G06F 3/0412* (2013.01); *G06F 3/0445* (2019.05); *G06F 3/04166* (2019.05); *G09G 3/3275* (2013.01); *G06F 2203/04107* (2013.01)

(58) Field of Classification Search
CPC .................. G06F 3/041–0412; H01L 27/323
See application file for complete search history.

(56) References Cited

U.S. PATENT DOCUMENTS

| | | | | |
|---|---|---|---|---|
| 2004/0004606 A1* | 1/2004 | Kodate | ............... | G09G 3/3659 345/204 |
| 2014/0267349 A1* | 9/2014 | Lee | ..................... | G06F 3/04184 345/589 |
| 2015/0130747 A1* | 5/2015 | Tsai | ....................... | G06F 3/0412 345/174 |
| 2018/0059855 A1* | 3/2018 | Gwon | ................... | G06F 3/0446 |
| 2018/0089487 A1* | 3/2018 | Kang | ................... | G06F 3/0412 |
| 2018/0107315 A1* | 4/2018 | Lee | ....................... | G09G 3/3677 |
| 2018/0113531 A1* | 4/2018 | Na | ....................... | G09G 3/2092 |

* cited by examiner

*Primary Examiner* — Sanjiv D. Patel
(74) *Attorney, Agent, or Firm* — Birch, Stewart, Kolasch & Birch, LLP

(57) ABSTRACT

A display device can include a display panel having a plurality of data lines, a plurality of gate lines and a plurality of subpixels are arrayed; a data driver configured to supply a video data signal including a first signal segment and a second signal segment maintaining a predetermined voltage difference to each of the plurality of data lines, and output readout data in response to signal sensing through each of the plurality of data lines to which the video data signal is supplied; and a touch controller configured to detect a touch based on the readout data, wherein each of the plurality of subpixels includes: an emitting device; a driving transistor; a first transistor; and a storage capacitor connected between a first node and a second node, and including a first plate and a second plate.

20 Claims, 26 Drawing Sheets

DISPLAY DEVICE AND DATA DRIVER

CROSS REFERENCE TO RELATED APPLICATION

This application is a Continuation of U.S. patent application Ser. No. 16/862,139, filed on Apr. 29, 2020, which claims priority benefit from Korean Patent Application No. 10-2019-0050562, filed in the Republic of Korea on Apr. 30, 2019, all of these applications are hereby incorporated by reference for all purposes as if fully set forth herein.

BACKGROUND

Field

Embodiments of the present invention relate to a display device and a data driver, and a driving method.

Description of Related Art

Along with the development of the information society, demand for display devices for displaying images is increasing.

Among such display devices, touch display devices provide touch-based user interfaces enabling users to intuitively and conveniently input data or instructions directly to devices, rather than using general data input systems, such as buttons, a keyboard, or a mouse.

Such a display device should be provided with a touchscreen panel including touch sensors to enable touch sensing. This may make the fabrication process of the display device complicated and difficult. In addition, since the display device should be provided with the display panel and the touchscreen panel, the size of the display device may be inevitably increased, which may be a limitation.

In addition, since the display device should provide both an image display function and a touch sensing function, the display device should divide a driving time, such as a frame time, into a display driving period and a touch driving period to perform display driving during the display driving period and sense a touch by touch driving during the touch driving period subsequent to the display driving period.

In such a general time division driving method, both the display driving time and the touch driving time may be insufficient, thereby possibly degrading both the display quality and touch sensitivity, which may be problematic. In particular, the application of the touch sensing function may have an impact on providing high-resolution and high-quality images.

BRIEF SUMMARY

Embodiments of the present invention can provide a display device, a data driver, and a driving method able to perform both display driving and touch sensing without being separately provided with a touchscreen panel.

In addition, the embodiments can provide a display device, a data driver, and a driving method able to simultaneously perform the display driving and the touch sensing.

In addition, the embodiments can provide a display device, a data driver, and a driving method able to perform the touch sensing without being separately provided with a dedicated touch sensor structure.

In addition, the embodiments can provide a display device, a data driver, and a driving method able to perform the touch sensing using subpixels designed for the display driving.

In addition, the embodiments can provide a display device, a data driver, and a driving method able to perform touch driving using a video data signal intended for the display driving.

According to an aspect, the embodiments can provide a display device including: a display panel in which a plurality of data lines and a plurality of gate lines are disposed and a plurality of subpixels are arrayed; and a data driver supplying a video data signal including a first signal segment and a second signal segment maintaining a predetermined voltage difference to each of the plurality of data lines and outputting readout data in response to signal sensing through each of the plurality of data lines to which the video data signal is supplied.

The display device can further include a touch controller detecting a touch or determining touch coordinates in accordance with the readout data.

Even in a case in which a voltage value of each of the first signal segment and the second signal segment supplied to each of the plurality of data lines changes, the voltage difference between the first signal segment and the second signal segment of the embodiments can be maintained to be constant.

According to the embodiments, during a period in which a gate signal having a turn-on voltage level is sequentially supplied to each of m number of gate lines among the plurality of gate lines, where the m is a natural number equal to or greater than 2, the data driver can output the readout data regarding a single touch sensor block, based on sensing signals sensed through n number of data lines among the plurality of data lines, respectively, where the n is a natural number equal to or greater than 2. The single touch sensor block corresponds to subpixels defined by the m number of gate lines and the n number of data lines, among the plurality of subpixels.

According to the embodiments, each of the plurality of subpixels can include an emitting device; a driving transistor driving the emitting device and including a first node, a second node, and a third node; a first transistor electrically connected between the first node and a data line among the plurality of data lines; and a storage capacitor electrically connected between the first node and the second node and including a first plate and a second plate.

The first plate of the storage capacitor being electrically connected to the first node of the driving transistor, and the second plate being electrically connected to the second node of the driving transistor.

According to the embodiments, the display device can further include a channel shield pattern overlapping a channel area of the driving transistor, wherein the channel shield pattern is electrically connected to the first plate of the storage capacitor.

According to the embodiments, the display device can further include a plurality of shield lines present corresponding to the plurality of data lines to shield the plurality of data lines and surrounding conductors located around the plurality of data lines from each other.

The data driver can supply a shield driving signal to each of the plurality of shield lines, the shield driving signal corresponding to the video data signal supplied to a corresponding data line among the plurality of data lines.

The gate signal can include a segment, a voltage level of which changes by an amplitude corresponding to the voltage difference between the first signal segment and the second signal segment of the video data signal.

The display panel can display a fake video while displaying a real video.

The fake video can be a black video or a low-gray video.

The data driver can output the fake video data signal corresponding to the fake video as the video data signal including the first signal segment and the second signal segment having the predetermined voltage difference.

The fake video data signal can swing while having the first signal segment and the second signal segment having the predetermined voltage difference, at a voltage equal to or lower than a low-gray voltage.

In another aspect, the embodiments can provide a data driver for driving a plurality of data lines disposed in a display panel. The data driver can include a latch circuit storing video data; a digital-to-analog converter converting the video data into an analog video signal in a form of an analog voltage; and a simultaneous driving circuit supplying a video data signal based on the analog video signal to each of the plurality of data lines, the video data signal including a first signal segment and a second signal segment maintaining a predetermined voltage difference, and outputting readout data in response to signal sensing through each of the plurality of data lines to which the video data signal is supplied.

Even in a case in which a voltage value of each of the first signal segment and the second signal segment supplied to each of the plurality of data lines changes, the voltage difference between the first signal segment and the second signal segment can be maintained to be constant.

According to the embodiments, during a period in which a gate signal having a turn-on voltage level is sequentially supplied to each of m number of gate lines among the plurality of gate lines, where the m is a natural number equal to or greater than 2, the simultaneous driving circuit can output the readout data regarding a single touch sensor block, based on sensing signals sensed through n number of data lines among the plurality of data lines, respectively, where the n is a natural number equal to or greater than 2. The single touch sensor block corresponds to subpixels defined by the m number of gate lines and the n number of data lines, among the plurality of subpixels.

According to the embodiments, the simultaneous driving circuit can include a plurality of simultaneous driving amplifiers supplying the video data signal to n number of data lines among the plurality of data lines, respectively; a plurality of analog-to-digital converters converting the sensing signals, sensed through the n number of data lines by the plurality of simultaneous driving amplifiers, to digital sensing values; and an integration circuit generating and outputting readout data regarding the single touch sensor block corresponding to the subpixels defined by the m number of gate lines and the n number of data lines by integrating the sensing values output from the plurality of analog-to-digital converters.

The simultaneous driving circuit can include a plurality of simultaneous driving amplifiers supplying the video data signal to each of n number of data lines among the plurality of data lines; an integration circuit outputting an integrated sensing signal by integrating the sensing signals sensed through the n number of data lines among the plurality of data lines by the plurality of simultaneous driving amplifiers; and an analog-to-digital converter outputting readout data based on the integrated sensing signal, regarding the single touch sensor block corresponding to the subpixels defined by the m number of gate lines and the n number of data lines.

The simultaneous driving circuit can include a shield driver electrically connected to a plurality of shield lines present corresponding to the plurality of data lines to shield the plurality of data lines and surrounding conductors located around the plurality of data lines from each other.

The shield driver can supply a shield driving signal to each of the plurality of shield lines, the shield driving signal corresponding to the video data signal supplied to a corresponding data line among the plurality of data lines.

The simultaneous driving circuit can include a plurality of simultaneous driving amplifiers supplying the video data signal to the plurality of data lines, respectively, and sensing the plurality of data lines, respectively.

Each of the plurality of simultaneous driving amplifiers can include an operation amplifier including a first input port through which the video data signal is input, a second input port connected to a data line among the plurality of data lines to output the video data signal, input through the first input port, to the data line, and an output port outputting a sensing signal sensed through the data line; and a feedback capacitor electrically connected to the second input port and the output port.

The simultaneous driving circuit can further include a plurality of output buffers supplying the video data signal to each of the plurality of data lines.

Each of the plurality of output buffers can include a buffer input port through which the video data signal is input and a buffer output port electrically connected to the data line.

The data line can be electrically connected to the second input port of each of the plurality of simultaneous driving amplifiers during a first driving timing period, and can be electrically connected to the buffer output port of each of the plurality of output buffers during a second driving timing period after the first driving timing period.

The video data signal can include the first signal segment, the second signal segment continuing from the first signal segment, and a third signal segment continuing from the second signal segment.

A voltage difference between the second signal segment and the third signal segment can be zero or smaller than the voltage difference between the first signal segment and the second signal segment.

The first signal segment and the second signal segment of the video data signal can be output to a corresponding data line among the plurality of data lines through a simultaneous driving amplifier among the plurality of simultaneous driving amplifiers during the first driving timing period.

The third signal segment of the video data signal can be output to the corresponding data line through a corresponding output buffer among the plurality of output buffers during the second driving timing period of the video data signal.

The display panel can display a fake video while displaying a real video. In this case, the simultaneous driving circuit outputs the fake video data signal corresponding to the fake video as the video data signal including the first signal segment and the second signal segment having the predetermined voltage difference.

When the gate signal having the turn-on voltage level is supplied to two or more gate lines among the plurality of gate lines, the simultaneous driving circuit can simultaneously supply the fake video data signal to subpixels included two or more rows of subpixels corresponding to the two or more gate lines, among the plurality of subpixels.

The fake video data signal can swing while having the first signal segment and the second signal segment having the predetermined voltage difference, at a voltage equal to or lower than a low-gray voltage.

The first signal segment of the fake video data signal can have a predetermined first voltage value, the second signal segment of the fake video data signal can have a predetermined second voltage value, and a voltage difference between the first voltage value and the second voltage value can be constant.

In another aspect, the embodiments can provide a method of driving a display device, the display device including a display panel in which a plurality of data lines and a plurality of gate lines are disposed and a plurality of subpixels are arrayed and a data driver driving the plurality of data lines.

The method of driving a display device according to the embodiments can include supplying a video data signal to each of the plurality of data lines; generating readout data based on signals sensed through the plurality of data lines, respectively, in response to the video data signal supplied to the plurality of data lines; and detecting a touch or determining touch coordinates in accordance with the readout data.

According to the embodiments, both display driving and touch sensing can be performed, even in a case in which the touchscreen panel is not separately provided. Accordingly, the size of the display device can be reduced, and the ease of fabrication of the display device can be increased.

In addition, according to the embodiments, the display driving and the touch sensing can be simultaneously performed. Accordingly, high-resolution images can be displayed, and a sufficient amount of time for the touch sensing can be obtained.

In addition, according to the embodiments, the touch sensing can be performed, even in a case in which a dedicated touch sensor structure is not separately provided.

In addition, according to the embodiments, the touch sensing can be performed using the subpixels designed for the display driving. Accordingly, a process of fabricating dedicated touch sensors in the panel is unnecessary, and the thickness of the panel can be reduced.

In addition, according to the embodiments, the touch driving can be performed using the video data signal intended for the display driving. Accordingly, it is unnecessary to generate a touch driving signal for the touch driving, and a driving operation can be easier.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION OF THE EMBODIMENTS

Figure 1:
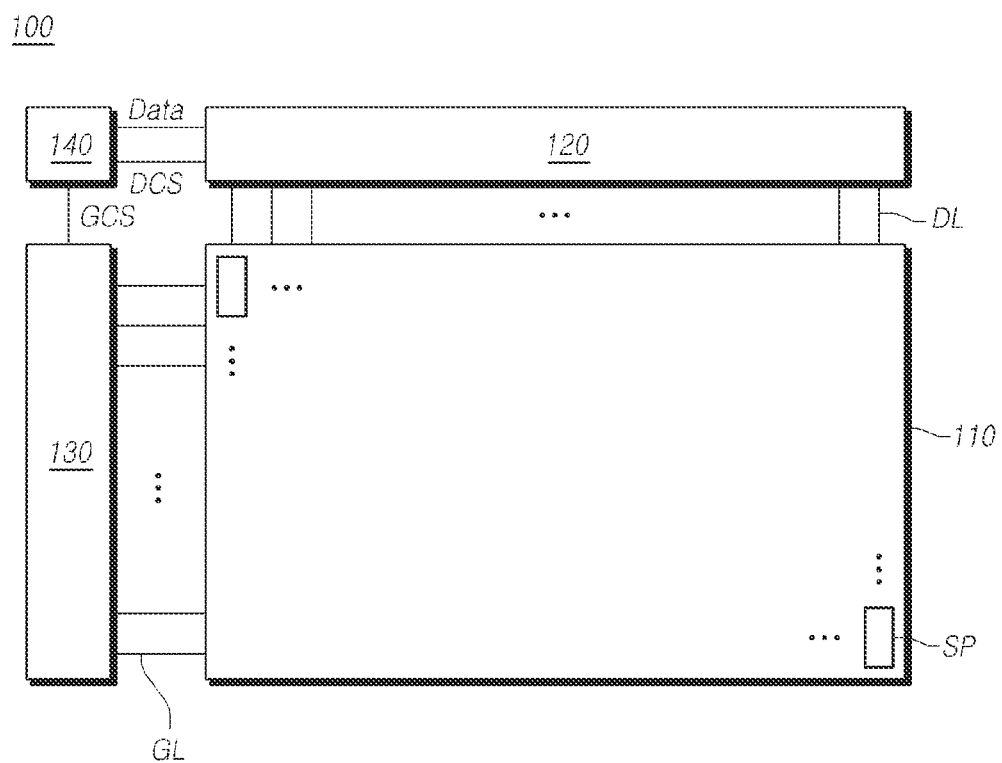
FIG. 1 is a diagram illustrating a system configuration of a display device according to one or more embodiments of the present invention.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as "including", "having", "containing", and "constituting" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present invention. Each of these terms is not used to define essence, order, sequence, or number of elements etc., but is used merely to distinguish the corresponding element from other elements.

When it is mentioned that a first element "is connected or coupled to", "overlaps" etc. a second element, it should be interpreted that, not only can the first element "be directly connected or coupled to" or "directly overlap" the second element, but a third element can also be "interposed" between the first and second elements, or the first and second elements can "be connected or coupled to", "overlap", etc. each other via a fourth element. Here, the second element can be included in at least one of two or more elements that "are connected or coupled to", "overlap", etc. each other.

When time relative terms, such as "after", "subsequent to", "next", "before", and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

FIG. 1 is a diagram illustrating a system configuration of a display device 100 according to one or more embodiments of the present invention. All the components of the display device according to all embodiments of the present invention are operatively coupled and configured.

Referring to FIG. 1, the display device 100 according to one or more embodiments can include a display panel 110 in which a plurality of data lines DL and a plurality of gate lines GL are disposed and a plurality of subpixels SP defined by the plurality of gate lines DL and the plurality of data lines GL are arrayed; and a driving circuit driving the display panel 110.

In terms of functions, the driving circuit can include a data driver 120 driving the plurality of data lines DL, a gate driver 130 driving the plurality of gate lines GL, a display controller 140 controlling the data driver 120 and the gate driver 130, and the like.

In the display panel 110, the plurality of data lines DL and the plurality of gate lines GL can be disposed to intersect each other. For example, the plurality of data lines DL can be disposed in rows or columns, and the plurality of gate lines GL can be disposed in columns or rows. Hereinafter, for the sake of brevity, the plurality of data lines DL will be described as being disposed in columns, while the plurality of gate lines GL will be described as being disposed in rows.

The display controller 140 controls the data driver 120 and the gate driver 130 by supplying a variety of control signals such data control signals DCS and gate control signals GCS necessary for driving operations of the data driver 120 and the gate driver 130.

The display controller 140 starts scanning at times (or points in time) defined by frames, converts video data received from an external source into a data signal format readable by the data driver 120 and outputs converted video data Data, and controls the data driving at appropriate times according to the scanning.

The display controller 140 receives a variety of timing signals, in addition to the video data, from an external source (e.g., a host system). The timing signals can include a vertical synchronization signal Vsync, a horizontal synchronization signal Hsync, an input data enable signal DE, a clock signal CLK, and the like.

The display controller 140, in addition to converting video data received from an external source into a data signal format readable by the data driver 120 and outputting the converted video data Data, receives the variety of timing signals, such as the vertical synchronization signal Vsync, the horizontal synchronization signal Hsync, the input data enable signal DE, and the clock signal CLK, generates a variety of control signals, and outputs the control signals to the data driver 120 and the gate driver 130 in order to control the data driver 120 and the gate driver 130.

For example, the display controller 140 outputs a variety of gate control signals GCS, including a gate start pulse GSP, a gate shift clock signal GSC, a gate output enable signal GOE, and the like, to control the gate driver 130.

Here, the gate start pulse GSP controls operation start times of the one or more gate driver integrated circuits (GDICs) constituting the gate driver 130. The gate shift clock GSC is a clock signal commonly input to the one or more GDICs to control shift times of a gate signal (i.e., gate pulse). The gate output enable signal GOE designates timing information of the one or more GDICs.

In addition, the display controller 140 outputs a variety of data control signals DCS, including a source start pulse SSP, a source sampling clock SSC, a source output enable signal SOE, and the like, to control the data driver 120.

Here, the source start pulse SSP controls data sampling start times of the one or more source driver integrated circuits (SDICs) of the data driver 120. The source sampling clock SSC is a clock signal that controls sampling times of data in each of the SDICs. The source output enable signal SOE controls output times of the data driver 120.

The display controller 140 can be a timing controller used in typical display technology or can be a control device including a timing controller to perform other control functions.

The display controller 140 can be provided as a component separate from the data driver 120 or can be provided as an integrated circuit (IC) together with the data driver 120.

The data driver 120 drives the plurality of data lines DL by receiving the video data used for image display from the display controller 140 and supplying a data voltage to the plurality of data lines DL. Herein, the data driver 120 will also be referred to as a source driver.

The data voltage can be a signal the same as an analog video signal obtained by converting the video data into an analog voltage or a signal obtained by converting the analog video signal by processing, such as amplification. Hereinafter, the data voltage will also be referred to as a video data signal.

The data driver 120 can include one or more source driver integrated circuits (SDICs).

Each of the SDICs can include a shift register, a latch circuit, a digital-to-analog converter (DAC), an output buffer, and the like.

In some cases, each of the SDICs can further include an analog-to-digital converter (ADC).

Each of the SDICs can be connected to a bonding pad of the display panel 110 by a tape-automated bonding (TAB) method or a chip-on-glass (COG) method, can be directly mounted on the display panel 110, or in some cases, can be provided as an integrated portion of the display panel 110. In addition, each of the SDICs can be implemented using a chip-on-film (COF) structure mounted on a film connected to the display panel 110.

The gate driver 130 sequentially drives the plurality of gate lines GL by sequentially supplying the gate signal to plurality of gate lines GL. Herein, the gate driver 130 will also referred to as a scan driver.

The gate signal is a signal applied to a gate electrode of a transistor in each of the subpixels SP through a corresponding gate line GL, and will also be referred to as a scan signal.

The gate driver 130 can include one or more gate driver integrated circuits (GDICs).

Each of the gate driver integrated circuits can include a shift register, a level shifter, and the like.

Each of the gate driver integrated circuits can be connected to a bonding pad of the display panel 110 by a TAB method or a COG method, can be implemented using a gate-in-panel (GIP) structure directly mounted on the display panel 110, or in some cases, can be provided as integrated portion of the display panel 110. In addition, each of the gate driver integrated circuits can be implemented using a COF structure mounted on a film connected to the display panel 110.

The gate driver 130 sequentially supplies the gate signal to the plurality of gate lines GL under the control of the display controller 140. Here, the gate signal can include a signal segment having a turn-on voltage level by which the corresponding transistor can be turned on and a signal segment having a turn-off voltage level by which the corresponding transistor can be turned off.

When a specific gate line is opened by the gate driver 130, the data driver 120 converts the video data, received from the display controller 140, into an analog data voltage (i.e., the video data signal) and supplies the analog data voltage to the plurality of data lines DL.

The data driver 120 can be located on one side of (above or below) the display panel 110, or in some cases, on both sides of (e.g., above and below) the display panel 110, depending on the driving method, the design of the panel, or the like.

The gate driver 130 can be located on one side (e.g., to the left or right) of the display panel 110, or in some cases, on both sides (e.g., to the left and right) of the display panel 110, depending on the driving method, the design of the panel, or the like.

The display device 100 according to embodiments can be, for example, an organic light-emitting diode (OLED) display device, a liquid crystal display (LCD) device, a plasma display device, or the like.

In a case in which the display device 100 according to embodiments is an LCD device, each of the subpixels SP of the display panel 110 includes a pixel electrode, a transistor for delivering the data voltage to the pixel electrode, and the like. A common electrode to which a common voltage is applied can be disposed in the display panel 110 to generate an electric field together with a pixel voltage (i.e., the data voltage) in the pixel electrode of each of the subpixels SP.

In a case in which the display device 100 according to embodiments is an OLED display device, each of the subpixels SP arrayed in the display panel 110 can include a self-emissive OLED and a circuit element, such as a driving transistor, for driving the OLED.

The type and number of circuit elements of each of the subpixels SP can be variously determined, depending on functions to be provided, the design, and the like.

Hereinafter, the display device 100 according to embodiments will be described as being an OLED display device for the sake of brevity.

Figure 2:
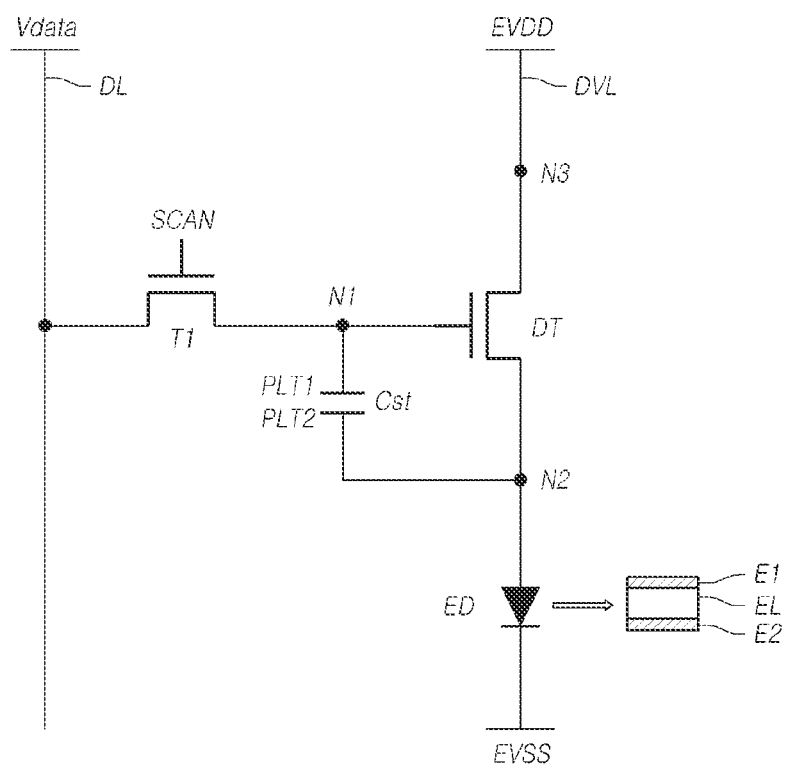
FIG. 2 is an equivalent circuit diagram illustrating a subpixel in the display device according to one or more embodiments of the present invention.
Figure 3:
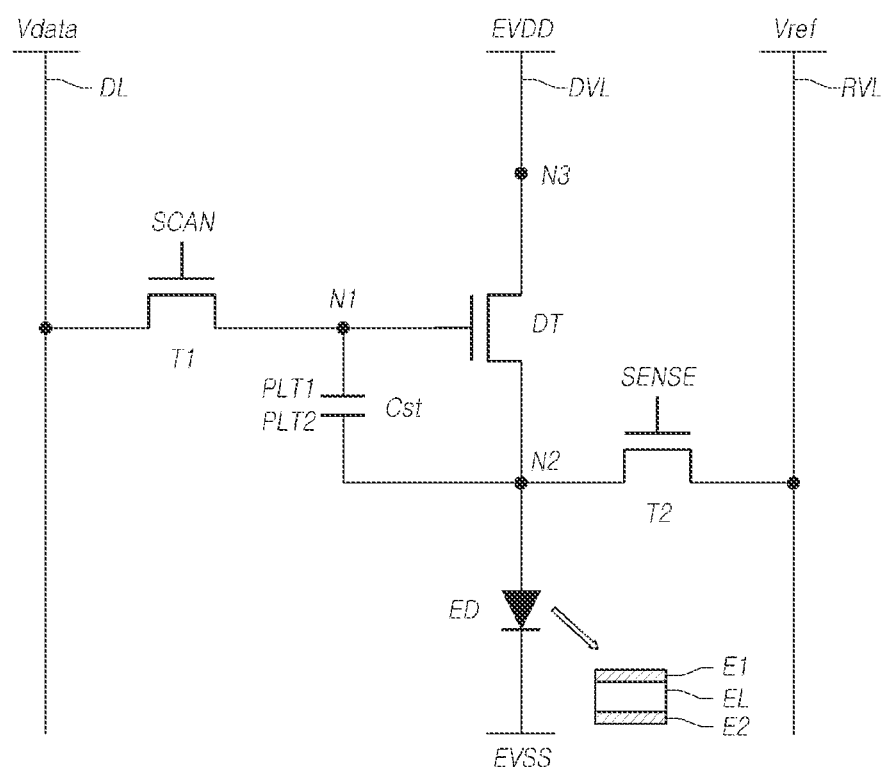
FIG. 3 is another equivalent circuit diagram illustrating a subpixel in the display device according to one or more embodiments of the present invention.

FIG. 2 is an equivalent circuit diagram illustrating each of the subpixels SP in the display device 100 according to one or more embodiments. FIG. 3 is another equivalent circuit diagram illustrating each of the subpixels SP in the display device 100 according to embodiments.

Referring to FIG. 2, in the display device 100 according to one or more embodiments, each of the subpixels SP can include an emitting device ED emitting light, a driving transistor DT driving the emitting device ED, a first transistor T1 electrically connected to a first node N1 of the driving transistor DT and a corresponding data line DL, a storage capacitor Cst electrically connected to the first node N1 and a second node N2 of the driving transistor DT, and the like.

The emitting device ED can include a first electrode E1, an emissive layer EL, a second electrode E2, and the like.

In the emitting device ED, the first electrode E1 can be an anode, while the second electrode E2 can be a cathode.

Alternatively, in the emitting device ED, the first electrode E1 can be a cathode, while the second electrode E2 can be an anode.

The first electrode E1 of the emitting device ED can be electrically connected to the second node N2 of the driving transistor DT.

A base voltage EVSS can be applied to the second electrode E2 of the emitting device ED. Herein, the base voltage EVSS can be, for example, a ground voltage or a voltage similar to the ground voltage.

The driving transistor DT drives the emitting device ED by supplying a driving current to the emitting device ED.

The driving transistor DT can include the first node N1, the second node N2, a third node N3, and the like.

The first node N1 of the driving transistor DT is a node corresponding to a gate node, and can be electrically connected to a source node or a drain node of the first transistor T1. The second node N2 of the driving transistor DT can be electrically connected to the first electrode E1 of the emitting device ED, and can be a source node or a drain node. The third node N3 of the driving transistor DT is a node to which a driving voltage EVDD is applied. The third node N3 can be electrically connected to a driving voltage line DVL, through which the driving voltage EVDD is supplied, and be a drain node or a source node.

Hereinafter, in the description of the driving transistor DT, the first node N1 will be regarded as a gate node, the second node N2 will be regarded as a source node, and the third node N3 will be regarded as a drain node for the sake of brevity.

The first transistor T1 can control the on/off state of the driving transistor DT, and can serve to deliver a video data signal Vdata to the first node N1 of the driving transistor DT.

The drain node or source node of the first transistor T1 can be electrically connected to a corresponding data line DL, the source node or drain node of the first transistor T1 can be electrically connected to the first node N1 of the driving transistor DT, and the gate node of the first transistor T1 can be electrically connected to a corresponding gate line to receive a scan signal SCAN.

The first transistor T1 can be on/off controlled by the scan signal SCAN applied to the gate node through a corresponding gate line. Herein, the scan signal SCAN is a type of gate signal.

The first transistor T1 can be turned on by the scan signal SCAN to deliver the video data signal Vdata, supplied through the corresponding data line DL, to the first node N1 of the driving transistor DT.

The storage capacitor Cst can be electrically connected to the first node N1 and the second node N2 of the driving transistor DT and maintain the video data signal Vdata corresponding to a video signal voltage or a voltage corresponding thereto during a one-frame time.

The storage capacitor Cst can include a first plate PLT1 and a second plate PLT2 spaced apart from each other. An insulating layer (i.e., a dielectric layer) can be situated between the first plate PLT1 and the second plate PLT2.

As described above, the single subpixel SP illustrated in FIG. 2 can have a 2T1C (i.e., 2 transistors and 1 capacitor) structure including two transistors DT and T1 and a single storage capacitor Cst to drive the emitting device ED.

The subpixel structure (i.e., 2T1C structure) illustrated in FIG. 2 is merely an example provided for the sake of explanation. The single subpixel SP can further include one or more transistors or one or more capacitors, depending on the function, panel structure, or the like.

For example, as illustrated in FIG. 3, the single subpixel SP can have a 3T1C (i.e., 3 transistors and 1 capacitor) structure further including a second transistor T2 electrically connected to the second node N2 of the driving transistor DT and a reference voltage line RVL.

Referring to FIG. 3, the second transistor T2 can be electrically connected to the second node N2 of the driving transistor DT and the reference voltage line RVL to be on/off controlled by a sense signal SENSE applied to the gate node.

More specifically, the drain node or the source node of the second transistor T2 can be electrically connected to the reference voltage line RVL, while the source node or the drain node of the second transistor T2 can be electrically connected to the second node N2 of the driving transistor DT. The gate node of the second transistor T2 can be electrically connected to the corresponding gate line GL to receive the sense signal SENSE. Herein, the sense signal SENSE is a type of gate signal.

For example, the second transistor T2 can be turned on in a display driving time segment, or can be turned on in a sensing driving time segment in which characteristics of the driving transistor DT or characteristics of the emitting device ED are sensed.

The second transistor T2 can be turned on by the sense signal SENSE at a corresponding driving time (e.g., a display driving time or a voltage initialization time of the second node N2 of the driving transistor DT within the sensing driving time segment) to deliver a reference voltage Vref, supplied through the reference voltage line RVL, to the second node N2 of the driving transistor DT.

In addition, the second transistor T2 can be turned on by the sense signal SENSE at a corresponding driving time (e.g., a sampling time within the sensing driving time segment) to deliver a voltage of the second node N2 of the driving transistor DT to the reference voltage line RVL.

For example, the second transistor T2 can control the voltage state of the second node N2 of the driving transistor DT or deliver the voltage of the second node N2 of the driving transistor DT to the reference voltage line RVL.

Here, the reference voltage line RVL can be electrically connected to an analog-to-digital converter (ADC) that senses a voltage of the reference voltage line RVL, converts the sensed voltage into a digital value, and outputs sensing data including the digital value.

The analog-to-digital converter can be included within each of the SDICs of which the data driver 120 is constituted.

The sensing data output from the analog-to-digital converter can be used to sense characteristics (e.g., a threshold voltage or mobility) of the driving transistor DT or characteristics (e.g., a threshold voltage) of the emitting device ED.

In addition, the storage capacitor Cst can be an external capacitor intentionally designed to be disposed externally of the driving transistor DT, rather than a parasitic capacitor (e.g., Cgs or Cgd), i.e., an internal capacitor present between the first node N1 and the second node N2 of the driving transistor DT.

Each of the driving transistor DT, the first transistor T1, and the second transistor T2 can be an N-type transistor or a P-type transistor.

In addition, the scan signal SCAN and the sense signal SENSE can be separate gate signals. In this case, the scan signal SCAN and the sense signal SENSE can be applied to the gate node of the first transistor T1 and the gate node of the second transistor T2 through different gate lines.

In some cases, the scan signal SCAN and the sense signal SENSE can be the same gate signal. In this case, the scan signal SCAN and the sense signal SENSE can be commonly applied to the gate node of the first transistor T1 and the gate node of the second transistor T2 through a single gate line.

The subpixel structures illustrated in FIGS. 2 and 3 are merely examples provided for the sake of explanation. Each of the subpixel structures can further include one or more transistors, or in some cases, one or more capacitors. Each of the plurality of subpixels can have the same structure, or some of the plurality of subpixels can have a different structure.

Hereinafter, each of the subpixels SP disposed in the display panel 110 will be described as being designed as the 3T1C structure illustrated in FIG. 3 for the sake of brevity.

First, the driving operation of each of the subpixels SP will be briefly described as an example.

The driving operation of each of the subpixels SP can include video data writing, boosting, and emission operations.

In the video data writing operation, the corresponding video data signal Vdata can be applied to the first node N1 of the driving transistor DT, and the reference voltage Vref can be applied to the second node N2 of the driving transistor DT. Here, due to resistance components between the second node N2 of the driving transistor DT and the reference voltage line RVL, when the reference voltage Vref is applied to the reference voltage line RVL, a voltage actually applied to the second node N2 of the driving transistor DT can be the reference voltage Vref or be slightly different from the reference voltage Vref.

In the video data writing operation, the first transistor T1 and the second transistor T2 can be turned on simultaneously or with an insignificant time difference by a turn-on voltage level of each of the scan signal SCAN and the sense signal SENSE.

In the video data writing operation, the storage capacitor Cst can be charged with an electric charge corresponding to a potential difference between two ends Vdata-Vref.

The application of the video data signal Vdata to the first node N1 of the driving transistor DT is referred to as video data writing.

In the boosting operation following the video data writing operation, the first node N1 and the second node N2 of the driving transistor DT can be electrically floated simultaneously or with an insignificant time difference therebetween.

In this regard, the first transistor T1 can be turned off by a turn-off voltage level of the scan signal SCAN. In addition, the second transistor T2 can be turned off by a turn-off voltage level of the sense signal SENSE.

In the boosting operation, the voltage of each of the first node N1 and the second node N2 of the driving transistor DT can be boosted while the voltage difference between the first node N1 and the second node N2 of the driving transistor DT is maintained.

When the boosted voltage of the second node N2 of the driving transistor DT reaches a predetermined voltage level or higher through the boosting of the voltages of the first node N1 and the second node N2 of the driving transistor DT during the boosting operation, the emission operation starts.

In this emission operation, a driving current can flow to the emitting device ED, so that the emitting device ED emits light.

Figure 4:
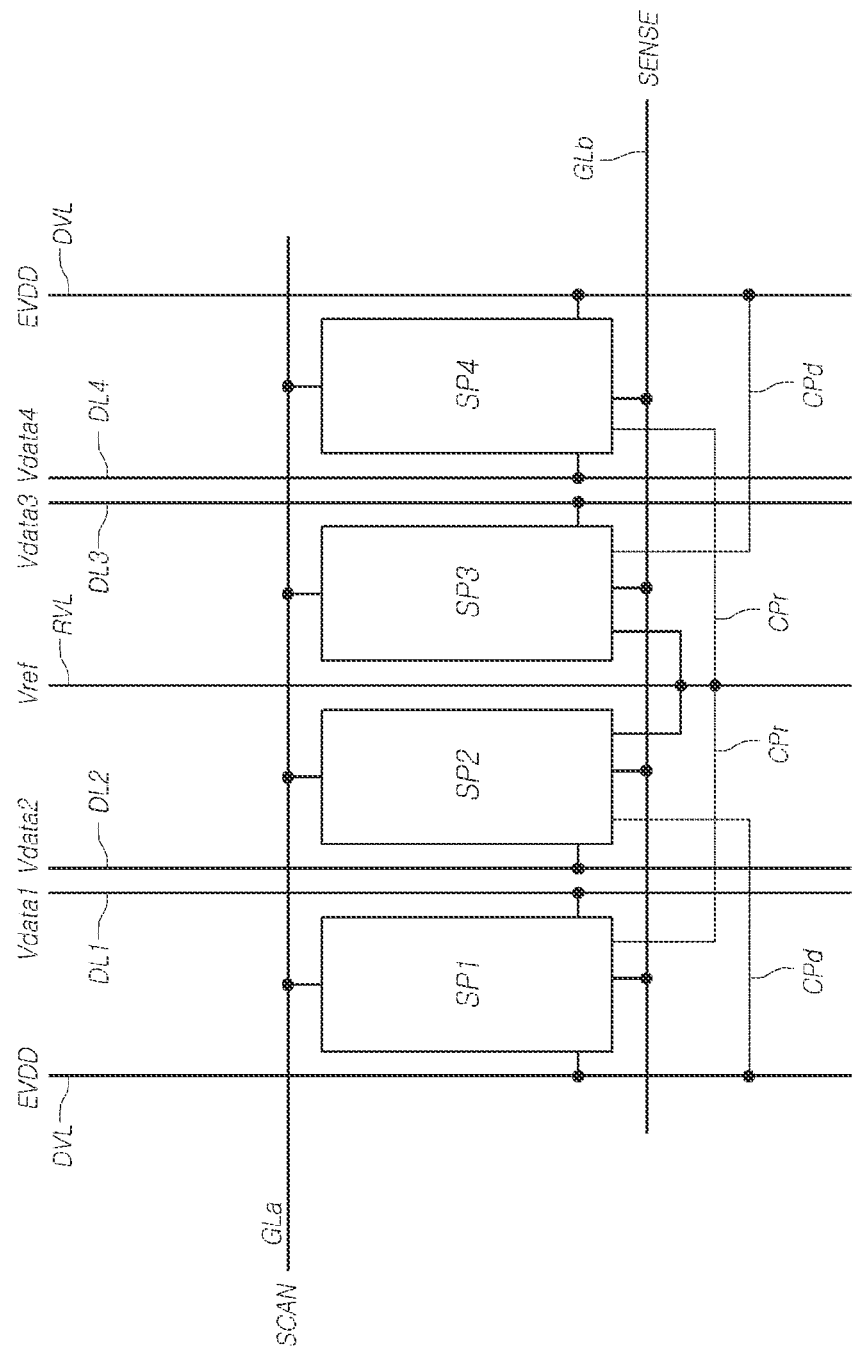
FIG. 4 is a diagram illustrating an arrangement of subpixels and signal lines in the display device according to one or more embodiments of the present invention.

FIG. 4 is a diagram illustrating an arrangement of subpixels SP1, SP2, SP3, and SP4 and signal lines DL1 to DL4, RVL, DVL, GLa, and GLb in the display device 100 according to one or more embodiments.

FIG. 4 is a plan view illustrating an area of the display panel 110, in which four subpixels SP1, SP2, SP3, and SP4 respectively having the subpixel structure illustrated in FIG. 3 are arrayed.

In FIG. 4, the four subpixels SP1, SP2, SP3, and SP4 are subpixels arrayed in a single row.

Referring to FIG. 4, in the area in which the four subpixels SP1, SP2, SP3, and SP4 are arrayed, one or more gate lines GLa and GLb can be disposed to extend in a row direction.

In FIG. 4, the two gate lines GLa and GLb are disposed to extend in the row direction in the area in which the four subpixels SP1, SP2, SP3, and SP4 are arrayed, in consideration of a case in which the scan signal SCAN applied to the gate node of the first transistor T1 and the sense signal SENSE applied to the gate node of the second transistor T2 are independent of each other in each of the subpixels SP1, SP2, SP3, and SP4, as described above.

In each of the subpixels SP1, SP2, SP3, and SP4, in a case in which the scan signal SCAN applied to the gate node of the first transistor T1 is the same as the sense signal SENSE applied to the gate node of the second transistor T2, a single gate line GLa or GLb can extend in the row direction in the area in which the four subpixels SP1, SP2, SP3, and SP4 are arrayed.

Referring to FIG. 4, in the area in which the four subpixels SP1, SP2, SP3, and SP4 are arrayed, four data lines DL1 to DL4 can extend in a column direction.

The four data lines DL1 to DL4 can supply corresponding video data signals Vdata1 to Vdata4 to the four subpixels SP1, SP2, SP3, and SP4.

Referring to FIG. 4, in the area in which the four subpixels SP1, SP2, SP3, and SP4 are disposed, driving voltage lines DVL can extend in the column direction.

A single driving voltage line DVL can be disposed for each column of subpixels.

In some cases, a single driving voltage line DVL can be disposed for two or more columns of subpixels. For example, the single driving voltage line DVL can be shared by the two or more columns of subpixels. Referring to the illustration of FIG. 4, a single driving voltage line DVL is disposed for every two columns of subpixels.

The left driving voltage line DVL (the left driving voltage line DVL in FIG. 4) can supply a driving voltage EVDD to the first subpixel SP1 and the second subpixel SP2. For example, the left driving voltage line DVL can be directly connected to one of the first subpixel SP1 and the second subpixel SP2 while being connected to the remaining one via a connecting pattern Cpd.

The right driving voltage line DVL (the right driving voltage line DVL in FIG. 4) can supply the driving voltage EVDD to the third subpixel SP3 and the fourth subpixel SP4. For example, the right driving voltage line DVL can be directly connected to one of the third subpixel SP3 and the fourth subpixel SP4 while being connected to the remaining one via a connecting pattern Cpd.

Referring to FIG. 4, in the area in which the four subpixels SP1, SP2, SP3, and SP4 are arrayed, the reference voltage line RVL can extend in the column direction.

A single reference voltage line RVL can be disposed for a single column of subpixels.

In some cases, a single reference voltage line RVL can be disposed for two or more columns of subpixels. For example, the single reference voltage line RVL can be shared by the two or more columns of subpixels.

Referring to the illustration of FIG. 4, a single reference voltage line RVL is disposed for every four columns of subpixels.

Thus, the reference voltage line RVL can supply the reference voltage Vref to the first to fourth subpixels SP1 to SP4. The reference voltage line RVL can be connected to one or more subpixels among the first to fourth subpixels SP1 to SP4 via a connecting pattern CPr.

As described above, since various types of signal lines DL1 to DL4, DVL, and RVL respectively extend in the column direction, for example, the first data line DL1 and the second data line DL2 among the four data lines DL1 to DL4 can extend between the first subpixel SP1 and the second subpixel SP2 in order to improve the aperture ratio of the display panel 110 and the regularity of the arrangement of the lines. The third data line DL3 and the fourth data line DL4 among the four data lines DL1 to DL4 can extend between the third subpixel SP3 and the fourth subpixel SP4.

Figure 5:
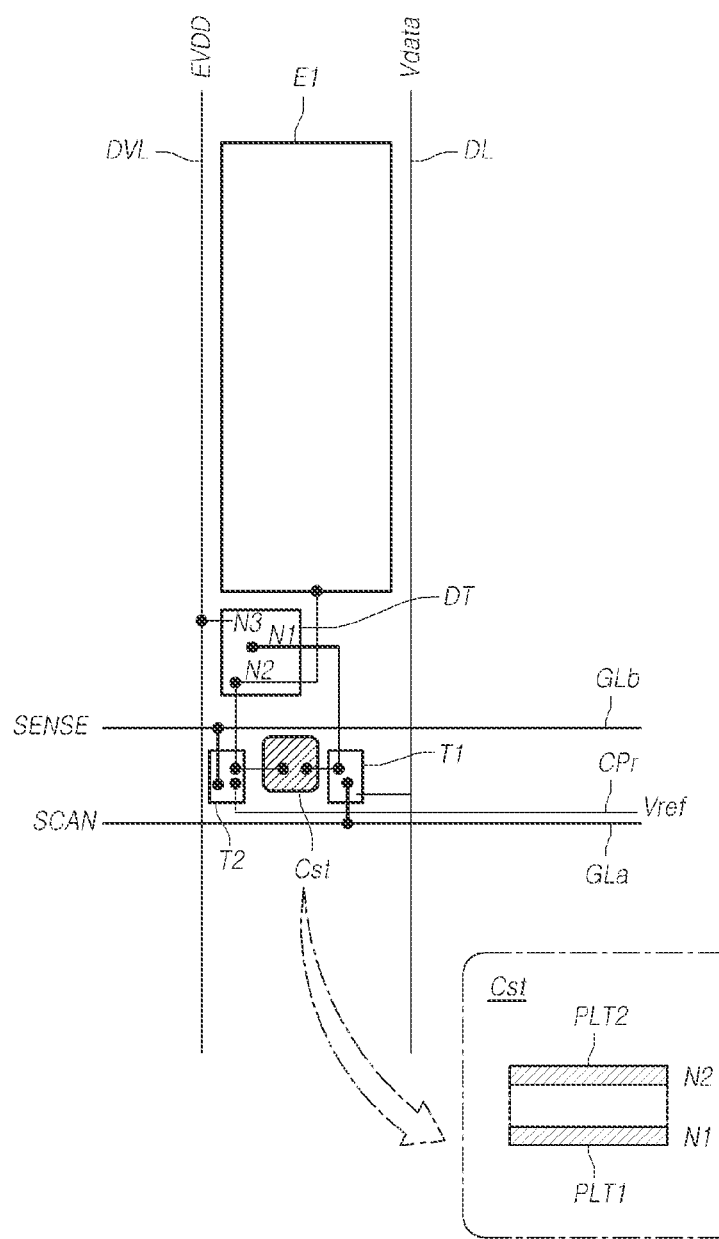
FIG. 5 is a diagram illustrating a planar structure of a subpixel in the display device according to one or more embodiments of the present invention.

FIG. 5 is a diagram illustrating a planar structure of each of the subpixels in the display device according to one or more embodiments.

FIG. 5 is a plan view illustrating the planar structure of each of the subpixels SP having the 3T1C structure as illustrated in FIG. 3.

Referring to FIG. 5, three transistors DT, T1, and T2, a single storage capacitor Cst, and a single first electrode E1 can be disposed in the area of each of the subpixels SP.

Referring to FIG. 5, in the area of each of the subpixels SP, the size, position, shape, or the like of each of the three transistors DT, T1, and T2, the single storage capacitor Cst, and the single first electrode E1 can be variously designed.

Referring to FIG. 5, the positions or the like of the signal lines DL, DVL, GLa, and GLb passing through the areas of the subpixels SP can be variously designed.

Referring to FIG. 5, in the area of each of the subpixels SP, the first plate PLT1 and the second plate PLT2 of the single storage capacitor Cst can correspond to the first node N1 and the second node N2 of the driving transistor DT.

In addition, the display device 100 according to embodiments can provide not only a display function but also a touch sensing function to detect a touch made by a touch object (e.g., a finger or a pen) of a user.

In a case in which the touch object has touched the screen, the display device 100 according to embodiments can detect the touch. In this case, the display device 100 can be regarded as providing contact touch sensing. Alternatively, even in a case in which the touch object has not contacted the screen, the display device 100 can detect a touch when the touch object is close to the screen. In this case, the display device 100 can be regarded as providing non-contact touch sensing, and this touch sensing mode can be referred to as a hovering mode or a gesture mode.

Hereinafter, the touch object will be described as being a finger for the sake of brevity.

A typical display device is separately provided with a touchscreen panel including touch electrodes corresponding to touch sensors to provide a touch sensing function. For example, a typical display device includes both a display panel and a touchscreen panel. In this case, the size (thickness) of the display device is inevitably increased.

In addition, a typical display device further includes a touch driver to drive the touchscreen panel and perform a sensing operation. Accordingly, since the typical display device should further include a display driver to drive the display panel and the touch driver to drive the touchscreen panel, the number of components is increased, and a significant degree of difficulty related to circuit connection is caused.

In contrast, the display device 100 according to embodiments does not include a separate touchscreen panel. Instead, the display panel 110 included in the display device 100 according to embodiments also serves as a touchscreen panel.

In particular, in the display device 100 according to embodiments, for the display panel 110 to serve as the touchscreen panel, none of the electrodes, signal lines, and other touch sensors (i.e., touch electrodes) necessary for touch driving are disposed inside of the display panel 110.

The display device 100 according to embodiments performs the touch sensing using the structure that has been present in the display panel 110 for the display driving.

In addition, the display device 100 according to embodiments to be described below does not include the separate touch driver for the touch sensing. The display driver included in the display device 100 according to embodiments also serves as the touch driver.

Meanwhile, the typical display device performs the display driving and the touch driving separately in different time fractions. In contrast, the display device 100 according to embodiments can simultaneously perform the display driving and the touch driving.

The display device 100 according to embodiments can supply the video data signal to each of the plurality of data lines DL and detect a touch and determine touch coordinates on the basis of a signal sensed through each of the plurality of data lines in response to the video data signal supplied to the plurality of data lines DL.

Hereinafter, a structure and method by which the display device 100 according to embodiments provides the touch sensing function will be described in more detail.

Figure 6:
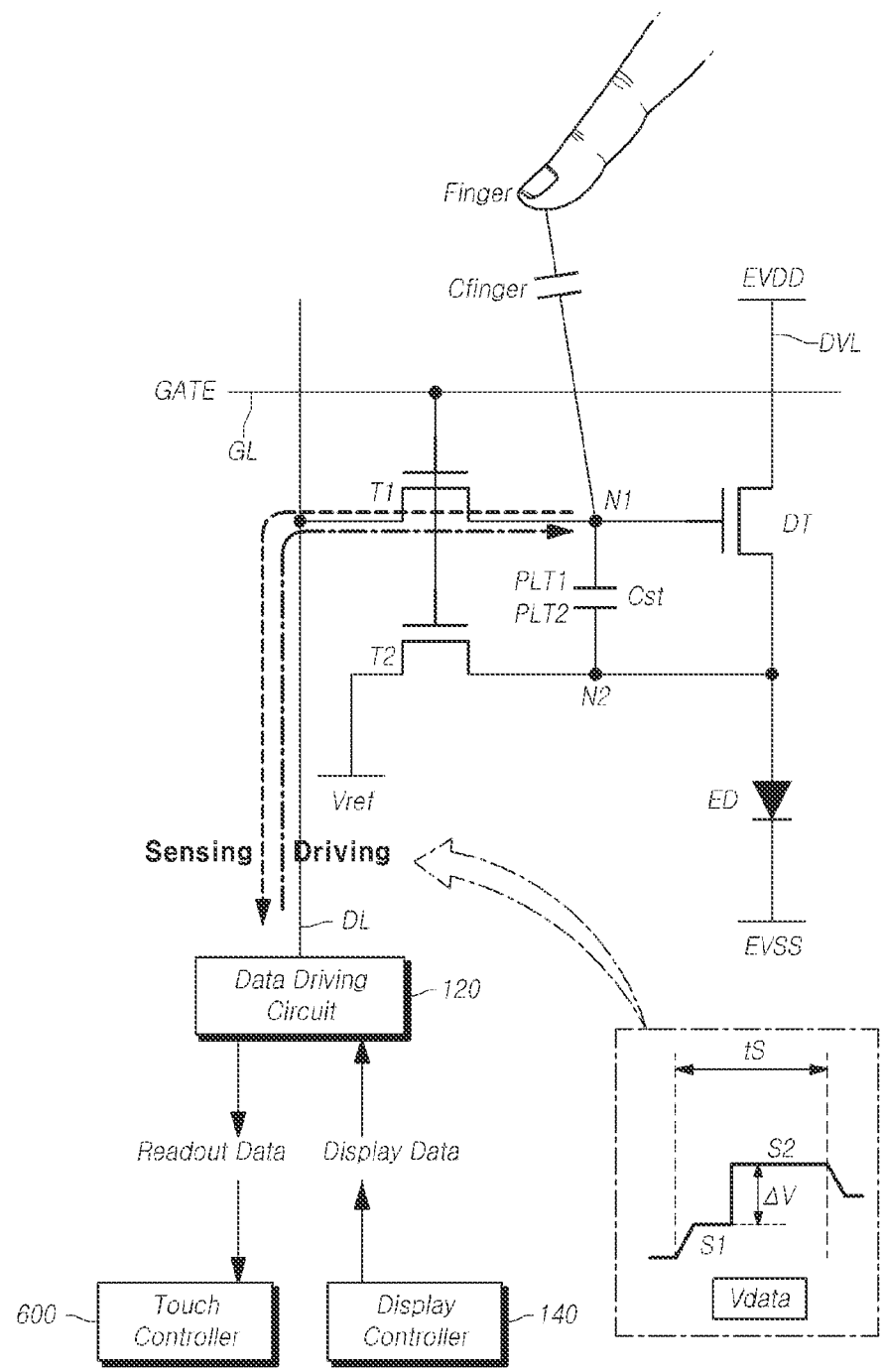
FIG. 6 is a diagram illustrating a structure and method by which the display device according to one or more embodiments of the present invention can simultaneously perform display driving and touch sensing.

FIG. 6 is a diagram illustrating a structure and method by which the display device 100 according to one or more embodiments can simultaneously perform the display driving and the touch sensing.

Hereinafter, for the sake of brevity, the scan signal SCAN and the sense signal SENSE applied to the gate node of the first transistor T1 and the gate node of the second transistor T2, respectively, in each of the subpixels SP will be assumed to be the same signal, i.e., a gate signal GATE. According to this assumption, a single gate line GL is disposed in a single row of subpixels. In addition, for the sake of brevity, the reference voltage line RVL can be omitted from the drawings.

Referring to FIG. 6, the display device 100 according to embodiments can include a display panel 110 in which the plurality of data lines DL and the plurality of gate lines GL are disposed and the plurality of subpixels SP are arrayed; the gate driver 130 supplying the gate signal GATE to each of the plurality of gate lines GL; the data driver (or data driving circuit) 120 supplying the video data signal Vdata, including a first signal segment S1 and a second signal segment S2 maintaining a predetermined voltage difference, to each of the plurality of data lines DL and outputting readout data in response to signal sensing through each of the plurality of data lines DL to which the video data signal Vdata is supplied; a touch controller 600 detecting a touch or determining touch coordinates on the basis of the readout data; and the like.

In the display device 100 according to embodiments, the video data signal Vdata supplied to each of the plurality of data lines DL not only basically functions as a signal for the image display but also functions as a touch driving signal for the touch sensing.

In this regard, the video data signal Vdata supplied to each of the plurality of data lines DL can include the first signal segment S1 and the second signal segment S2 maintaining a predetermined voltage difference $\Delta V$.

In the display device 100 according to embodiments, the plurality of data lines DL can serve not only as signal lines for the display driving but also as signal lines for the touch driving.

In the display device 100 according to embodiments, the video data signal Vdata supplied to the data line DL can be input to the subpixels SP arrayed along the gate line GL through which the gate signal GATE having a turn-on level voltage is applied in response to gate scanning.

Consequently, the video data signal Vdata supplied to the data line DL can be delivered to the first node N1 of the driving transistor DT through the turned-on first transistor T1 in the corresponding subpixels SP.

The video data signal Vdata delivered to the first node N1 of the driving transistor DT is applied to the first plate PLT1 of the storage capacitor Cst.

The video data signal Vdata applied to the first plate PLT1 of the storage capacitor Cst can generate image display capacitance (i.e., capacitance for image display) together with the reference voltage Vref applied to the second plate PLT2 of the storage capacitor Cst.

For example, in a case in which the display device 100 performs the self-capacitance-based touch sensing, the video data signal Vdata applied to the first plate PLT1 of the storage capacitor Cst can generate touch sensing capacitance Cfinger (i.e., capacitance for touch sensing) together with a finger while generating the image display capacitance.

Accordingly, in the display device 100 according to embodiments, the first plate PLT1 of the storage capacitor Cst present in each of the subpixels SP serves as a touch electrode (or touch sensor).

The video data signal Vdata applied to the first plate PLT1 of the storage capacitor Cst includes the first signal segment S1 and the second signal segment S2 maintaining the predetermined voltage difference ΔV, so that the first plate PLT1 of the storage capacitor Cst serves as the touch electrode.

The video data signal Vdata can include the first signal segment S1 and the second signal segment S2 for a set time tS. Here, the set time tS can correspond to a period for which the corresponding gate line GL has a turn-on voltage level. The set time tS can be a one-horizontal time 1H, a two-horizontal time 2H, or the like, or in some cases, can be a period (e.g., 1.6H) that is a real number times the one-horizontal time.

The voltage value of the second signal segment S2 of the video data signal Vdata supplied to each of the plurality of data lines DL corresponds to a substantial voltage value for the image display. Thus, the voltage value of the second signal segment S2 of the video data signal Vdata, supplied to each of the plurality of data lines DL, is a voltage value that can change in response to changes in a video frame.

However, the voltage difference ΔV between the first signal segment S1 and the second signal segment S2 of the video data signal Vdata, supplied to each of the plurality of data lines DL, is a voltage change for the touch sensing. The voltage difference ΔV is a value that should be maintained at a predetermined level for touch sensitivity.

The voltage value of the first signal segment S1 of the video data signal Vdata, supplied to each of the plurality of data lines DL, corresponds to a voltage value obtained by subtracting the voltage difference ΔV from the voltage value of the second signal segment S2 in order to produce the voltage difference ΔV necessary for the touch sensing.

As described above, even in a case in which the voltage value of each of the first signal segment S1 and the second signal segment S2 of the video data signal Vdata, supplied to each of the plurality of data lines DL, changes, the voltage difference ΔV between the first signal segment S1 and the second signal segment S2 can be maintained to be constant.

The first signal segment S1 of the video data signal Vdata has a voltage value by which the voltage difference ΔV between the first signal segment S1 and the second signal segment S2 is maintained to be constant, even in a case in which the voltage value of the second signal segment S2 has a random characteristic. In this aspect, the first signal segment S1 of the video data signal Vdata can be referred to as voltage making signal segment or a reset signal segment.

Accordingly, the voltage value of the first signal segment S1 of the video data signal Vdata also has a random characteristic, like the voltage value of the second signal segment S2.

Since the video data signal Vdata has the above-described signal characteristics, the video data signal Vdata functions as the display driving signal for the image display while functioning as the touch driving signal for the touch driving.

Accordingly, the display device 100 according to embodiments can perform the touch sensing by performing both the display driving and the touch driving by directly using the existing subpixels SP.

Figure 7:
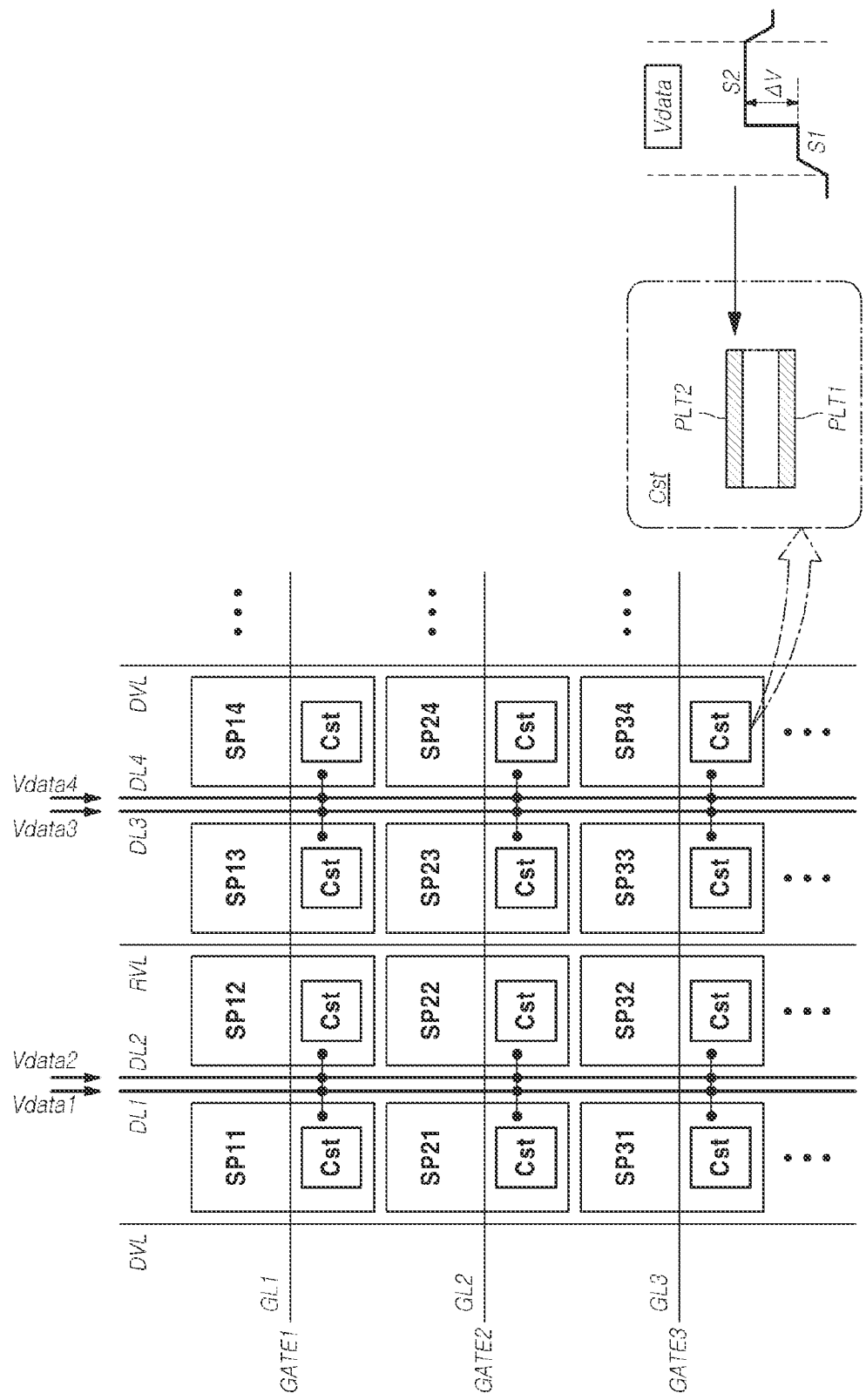
FIG. 7 is a diagram illustrating an arrangement of subpixels, data lines, gate lines, and storage capacitors for explaining a simultaneous driving structure and a simultaneous driving method of the display device according to one or more embodiments of the present invention.

FIG. 7 is a diagram illustrating an arrangement of the subpixels SP, the data lines DL, the gate lines GL, and the storage capacitors Cst for explaining a simultaneous driving structure and a simultaneous driving method of the display device 100 according to embodiments.

FIG. 7 illustrates a panel structure for explaining the simultaneous driving structure and the simultaneous driving method by which the display device 100 according to one or more embodiments simultaneously provides the display driving and the touch driving using the subpixels SP.

Referring to FIG. 7, a first gate line GL1 corresponding to a first row of subpixels delivers a first gate signal GATE1 to subpixels SP11, SP12, SP13, SP14, and . . . arrayed in the first row of subpixels. A second gate line GL2 corresponding to a second row of subpixels delivers a second gate signal GATE2 to subpixels SP21, SP22, SP23, SP24, and . . . arrayed in the second row of subpixels. A third gate line GL3 corresponding to a third row of subpixels delivers a third gate signal GATE3 to subpixels SP31, SP32, SP33, SP34, and . . . arrayed in the third row of subpixels.

Referring to FIG. 7, the subpixels SP11, SP21, SP31, and . . . arrayed in a first column of subpixels can sequentially receive a corresponding first video data signal Vdata1 through the first data line DL1 corresponding to the first column of subpixels, at corresponding times. The subpixels SP12, SP22, SP32, and . . . arrayed in a second column of subpixels can sequentially receive a corresponding second video data signal Vdata2 through the second data line DL2 corresponding to the second column of subpixels, at corresponding times. The subpixels SP13, SP23, SP33, and . . . arrayed in a third column of subpixels can sequentially receive a third video data signal Vdata3 through the third data line DL3 corresponding to the third column of subpixels, at corresponding times. The subpixels SP14, SP24, SP34, and . . . arrayed in a fourth column of subpixels can sequentially receive a fourth video data signal Vdata4 through the fourth data line DL4 corresponding to the fourth column of subpixels, at corresponding times.

Referring to FIG. 7, the storage capacitor Cst including the first plate PLT1 and the second plate PLT2 can be disposed in each area of all of the subpixels SP11, SP12, and . . . .

Referring to FIG. 7, the first plate PLT1 in the first plate PLT1 and the second plate PLT2 of the storage capacitor Cst is electrically connected to the first node N1 of the driving transistor DT. The second plate PLT2 of the storage capacitor Cst is electrically connected to the second node N2 of the driving transistor DT.

Accordingly, the corresponding video data signal Vdata including the first signal segment S1 and the second signal segment S2 can be applied to the first plate PLT1 of the storage capacitor Cst.

Figure 8:
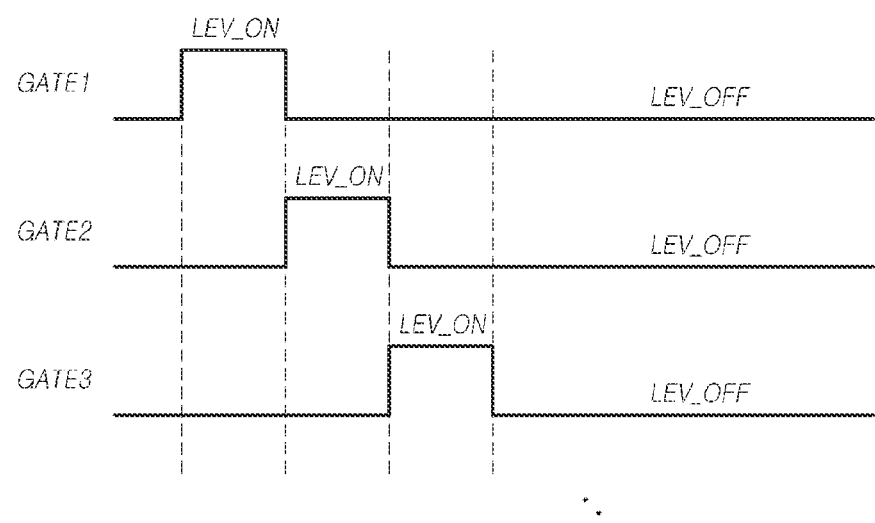
FIG. 8 is a gate driving timing diagram in case of simultaneous driving of the display device according to one or more embodiments of the present invention.

FIG. 8 is a gate driving timing diagram in case of simultaneous driving of the display device 100 according to embodiments.

Referring to FIG. 8, in case of the simultaneous driving of the display device 100 according to embodiments, each of the gate signals GATE1, GATE2, GATE3, and . . . applied to the plurality of gate lines GL1, GL2, GL3, and . . . , respectively, can include a signal segment having a turn-on voltage level LEV_ON and a signal segment having a turn-off voltage level LEV_OFF.

In the gate signals GATE1, GATE2, GATE3, and . . . applied to the plurality of gate lines GL1, GL2, GL3, and . . . , the signal segments having the turn-on voltage level LEV_ON can be located at predetermined gate driving times.

For example, in each of the signal segments of the gate signals GATE1, GATE2, GATE3, and . . . , having the turn-on voltage level LEV_ON, the temporal length can be a one-horizontal time 1H, a two-horizontal time 2H, or the like, and in some cases, can be a period (e.g., 1.6H) that is a real number times the one-horizontal time.

Referring to FIG. 8, in each of the gate signals GATE1, GATE2, GATE3, and . . . , the signal segments having the turn-on voltage level LEV_ON may not overlap each other.

In some cases, in each of the gate signals GATE1, GATE2, GATE3, and . . . , the signal segments having the turn-on voltage level LEV_ON can overlap each other.

Figure 9:
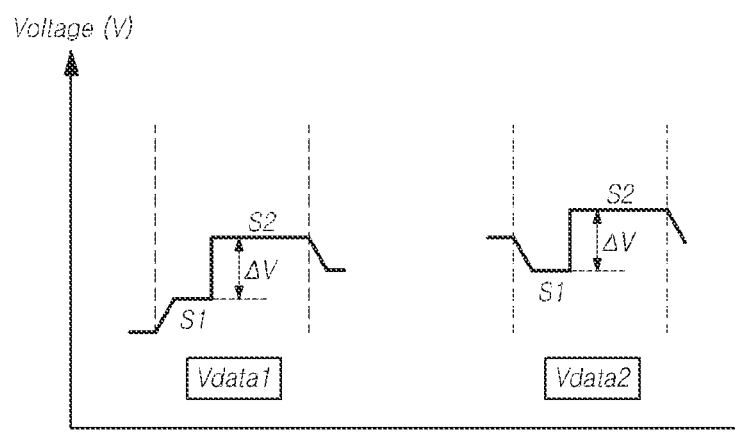
FIG. 9 is a diagram illustrating a first video data signal supplied to a first data line and a second video data signal supplied to a second data line in case of simultaneous driving of the display device according to one or more embodiments of the present invention.

FIG. 9 is a diagram illustrating the first video data signal Vdata1 supplied to the first data line DL1 and the second video data signal Vdata2 supplied to the second data line DL2 in case of the simultaneous driving of the display device 100 according to embodiments.

Referring to FIG. 9, an actual voltage value of the video data signal Vdata (i.e., a voltage value of the second signal segment S2) expressing a gray level for the image display can have a random characteristic from the perspective of the display panel 110.

For example, the voltage value of the second signal segment S2 of the first video data signal Vdata1, supplied to the first data line DL1 among the plurality of data lines DL disposed in the display panel 110, and the voltage value of the second signal segment S2 of the second video data signal Vdata2, supplied to the second data line DL2 among the plurality of data lines DL, can be the same or different from each other.

However, the voltage difference ΔV between the first signal segment S1 and the second signal segment S2 of the first video data signal Vdata1, supplied to the first data line DL1 among the plurality of data lines DL disposed in the display panel 110, and the voltage difference ΔV between the first signal segment S1 and the second signal segment S2 of the second video data signal Vdata2, supplied to the second data line DL2 among the plurality of data lines DL, can correspond to each other.

For example, the voltage difference ΔV between the first signal segment S1 and the second signal segment S2 of the first video data signal Vdata1 supplied to the first data line DL1 and the voltage difference ΔV between the first signal segment S1 and the second signal segment S2 of the second video data signal Vdata2 supplied to the second data line DL2 can be the same.

Even in a case in which the voltage value of the second signal segment S2 of each of the first video data signal Vdata and the second video data signal Vdata2 has a random characteristic, the first signal segment S1 of each of the first video data signal Vdata and the second video data signal Vdata2 has a voltage value causing the voltage difference ΔV between the first signal segment S1 and the second signal segment S2 of the first video data signal Vdata1 supplied to the first data line DL1 and the voltage difference ΔV between the first signal segment S1 and the second signal segment S2 of the second video data signal Vdata2 supplied to the second data line DL2 to be the same.

Accordingly, the voltage value of the first signal segment S1 of each of the first video data signal Vdata1 and the second video data signal Vdata2 is also a random voltage value.

In this sense, the first signal segment S1 of each of the first video data signal Vdata and the second video data signal Vdata2 can be referred to as a voltage making signal segment or a reset signal segment.

Figure 10:
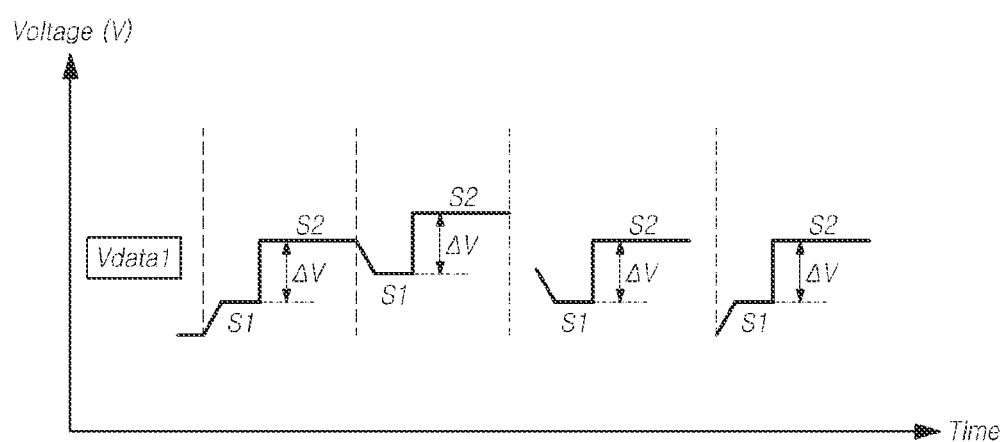
FIG. 10 is a diagram illustrating a first video data signal supplied to a first data line with the elapse of a driving time in case of simultaneous driving of the display device according to one or more embodiments of the present invention.

FIG. 10 is a diagram illustrating the first video data signal Vdata1 supplied to the first data line DL1 with the elapse of the driving time in case of the simultaneous driving of the display device 100 according to embodiments.

Referring to FIG. 10, even in a case in which the voltage value of the second signal segment S2 of the first video data signal Vdata1 supplied through the first data line DL1 changes with the change of the driving time (i.e., changes in the subpixels SP to which the video data signal is supplied), the voltage difference ΔV between the first signal segment S1 and the second signal segment S2 of the first video data signal Vdata1 is maintained to be constant.

To maintain the voltage difference ΔV between the first signal segment S1 and the second signal segment S2 of the first video data signal Vdata1 to be constant, the voltage value of the first signal segment S1 of the first video data signal Vdata1 changes with the change of the driving time.

Even in a case in which the voltage value of the second signal segment S2 of the second video data signal Vdata2 supplied through the second data line DL2 changes, the voltage difference ΔV between the first signal segment S1 and the second signal segment S2 of the second video data signal Vdata2 is maintained to be constant.

To maintain the voltage difference ΔV between the first signal segment S1 and the second signal segment S2 of the second video data signal Vdata2 is maintained to be constant, the voltage value of the first signal segment S1 of the second video data signal Vdata2 changes with the change of the driving time.

In addition, even in a case in which the voltage value of the second signal segment S2 of the first video data signal Vdata1 and the voltage value of the second signal segment S2 of the second video data signal Vdata2 change with the change of the driving time, the voltage difference ΔV between the first signal segment S1 and the second signal segment S2 of the first video data signal Vdata1 and the voltage difference ΔV between the first signal segment S1 and the second signal segment S2 of the second video data signal Vdata2 can correspond to each other or the same.

Figure 11:
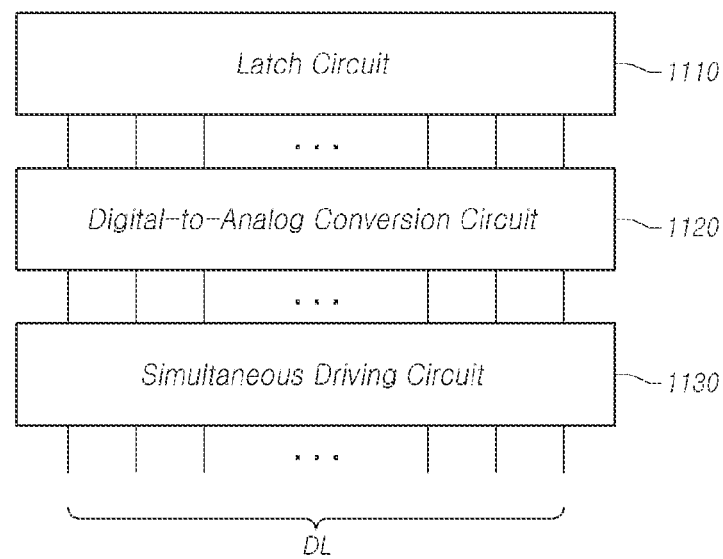
FIG. 11 is a diagram illustrating a configuration of a data driver of the display device according to one or more embodiments of the present invention.

FIG. 11 is a diagram illustrating a configuration of the data driver 120 of the display device 100 according to one or more embodiments.

Referring to FIG. 11, the data driver 120 of the display device 100 according to embodiments can include a latch circuit 1110, a digital-to-analog converting circuit 1120, a simultaneous driving circuit 1130, and the like. The latch circuit 1110 stores the video data. The digital-to-analog converting circuit 1120 converts the video data into an analog video signal in the form of an analog voltage. The simultaneous driving circuit 1130 supplies the video data signal Vdata, including the first signal segment S1 and the second signal segment S2 maintaining the predetermined voltage difference ΔV on the basis of the analog video signal, to each of the plurality of data lines DL, and outputs the readout data in response to signal sensing through each of the plurality of data lines DL to which the video data signal Vdata is supplied.

The latch circuit 1110 can include one or more latches for each of the plurality of data lines DL.

The digital-to-analog converting circuit 1120 can include a plurality of digital-to-analog converters (DACs).

Figure 12:
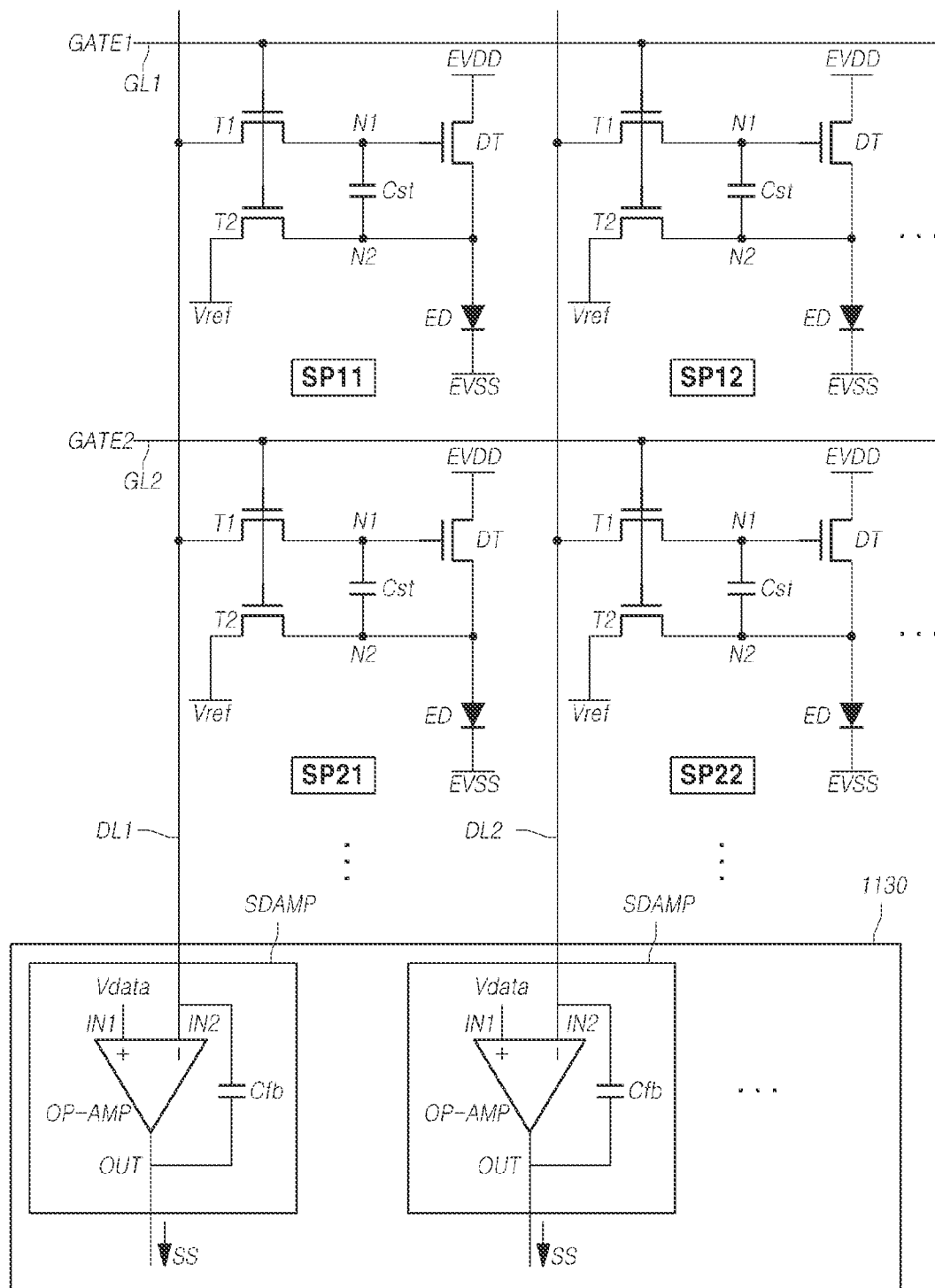
FIG. 12 is a diagram illustrating a simultaneous driving circuit in the data driver of the display device according to one or more embodiments of the present invention.

FIG. 12 is a diagram illustrating the simultaneous driving circuit 1130 in the data driver 120 of the display device 100 according to embodiments.

Referring to FIG. 12, the data driver 120 can include a simultaneous driving circuit 1130 driving a plurality of data lines DL1, DL2, and . . . for the display driving and sensing the plurality of data lines DL1, DL2, and . . . for the touch sensing.

Referring to FIG. 12, the simultaneous driving circuit 1130 can include a plurality of simultaneous driving amplifiers SDAMP supplying the video data signal Vdata to the plurality of data lines DL1, DL2, and . . . and performing sensing on the plurality of data lines DL1, DL2, and . . . .

For example, each of the plurality of simultaneous driving amplifiers SDAMP can be implemented as a charge amplifier, a current conveyor, a sigma-delta modulator, or the like.

Hereinafter, for the sake of brevity, each of the plurality of simultaneous driving amplifiers SDAMP will be described as being implemented as a charge amplifier.

Each of the plurality of simultaneous driving amplifiers SDAMP can include an operation amplifier OP-AMP, a feedback capacitor Cfb, and the like.

The operation amplifier OP-AMP included in each of the plurality of simultaneous driving amplifiers SDAMP can include a first input port IN1 through which the corresponding video data signal Vdata is input; a second input port IN2 connected to the corresponding data line DL to output the video data signal Vdata, input through the first input port IN1, to the corresponding data line DL; an output port OUT outputting a sensing signal SS sensed through the corresponding data line DL; and the like.

The feedback capacitor Cfb can be electrically connected to the second input port IN2 and the output port OUT of the operation amplifier OP-AMP.

The amount of electric charge stored in the feedback capacitor Cfb can vary depending on the presence/absence, position, or the like of the touch object close to the corresponding storage capacitor Cst, thereby changing the sensing signal SS output from the output port OUT of the operation amplifier OP-AMP.

Figure 13:
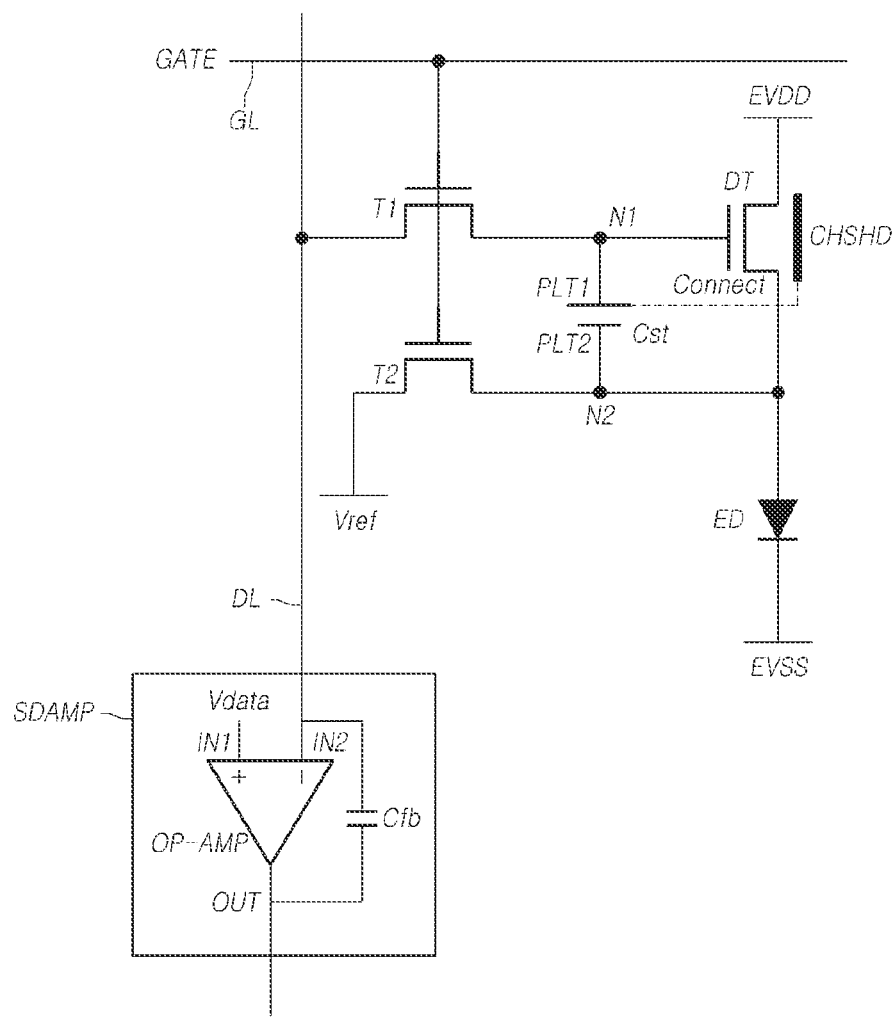
FIG. 13 is a diagram illustrating a structure of connecting a first plate of the storage capacitor and a channel shield pattern to improve touch sensitivity of the display device according to one or more embodiments of the present invention.

FIG. 13 is a diagram illustrating a structure of connecting the first plate PLT1 of the storage capacitor Cst and a channel shield pattern to improve touch sensitivity of the display device 100 according to embodiments.

Referring to FIG. 13, the entirety or a portion of the plurality of subpixels SP can include a channel shield pattern CHSHD overlapping with a channel area of the driving transistor DT.

The channel shield pattern CHSHD is a pattern protecting the channel of the driving transistor DT.

For example, the channel shield pattern CHSHD can prevent a channel of the driving transistor DT, which is vulnerable to light, from being irradiated with light. Thus, the channel shield pattern CHSHD is also referred to as a light shield.

The channel shield pattern CHSHD can be electrically connected to the first plate PLT1 of the storage capacitor Cst.

As described above, the channel shield pattern CHSHD being electrically connected to the first plate PLT1 of storage capacitor Cst can increase the area of the electrode to which the video data signal Vdata is applied. Accordingly, the touch sensitivity can be improved.

Figure 14:
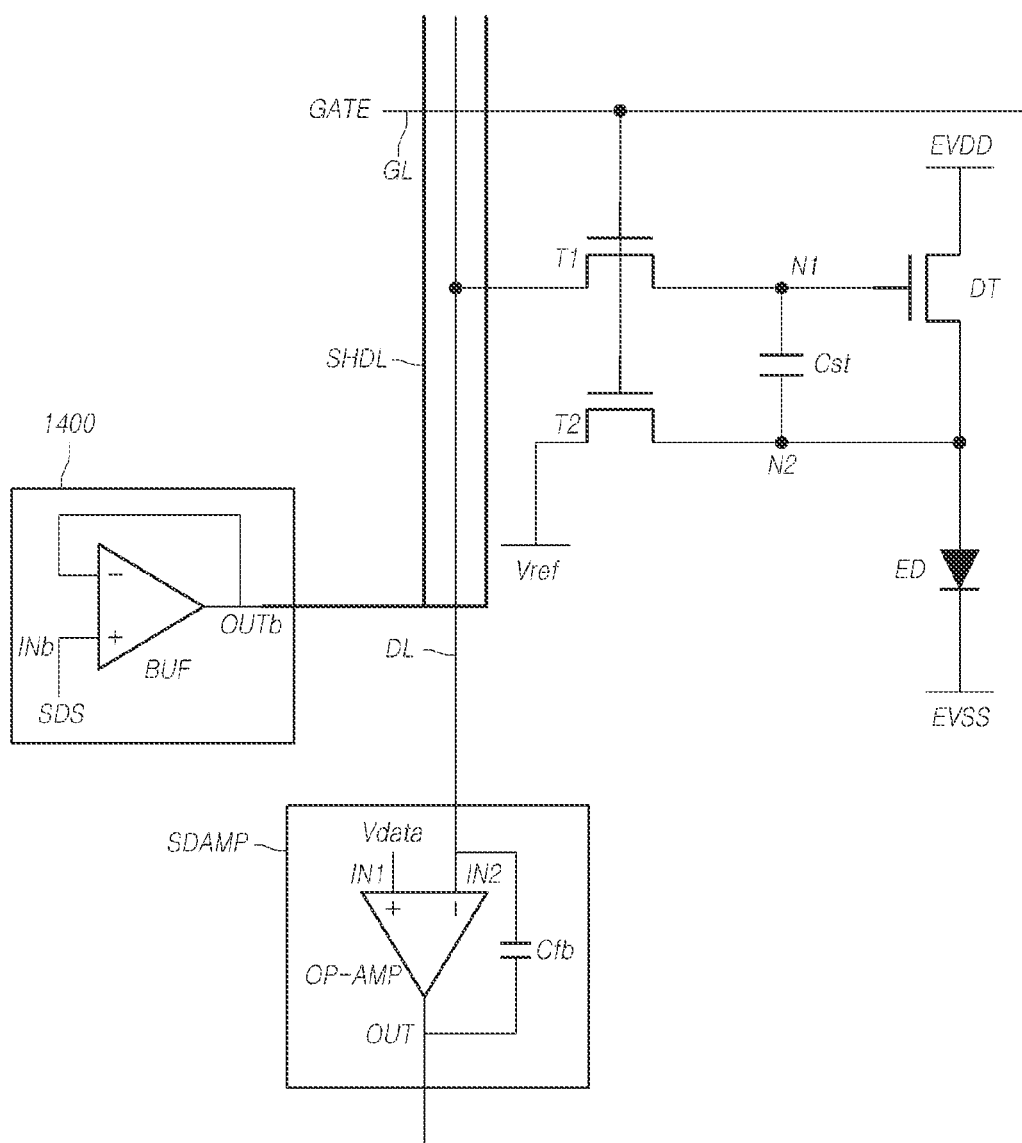
FIG. 14 is a diagram illustrating components, such as a shield line for shielding a data line and a shield driver, for improving touch sensitivity in the display device according to one or more embodiments of the present invention.
Figure 15:
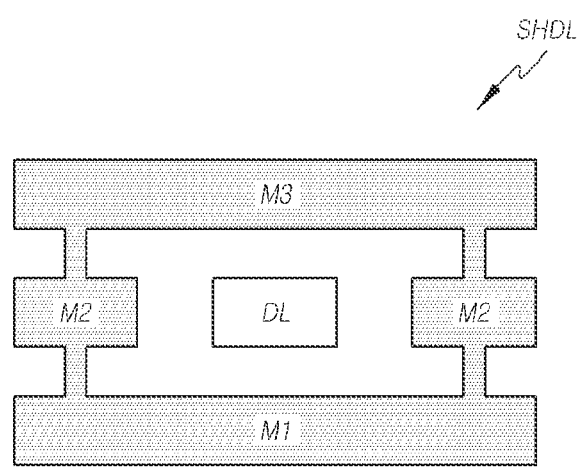
FIG. 15 is a diagram illustrating a structure of the shield line for improving touch sensitivity in the display device according to one or more embodiments of the present invention.
Figure 16:
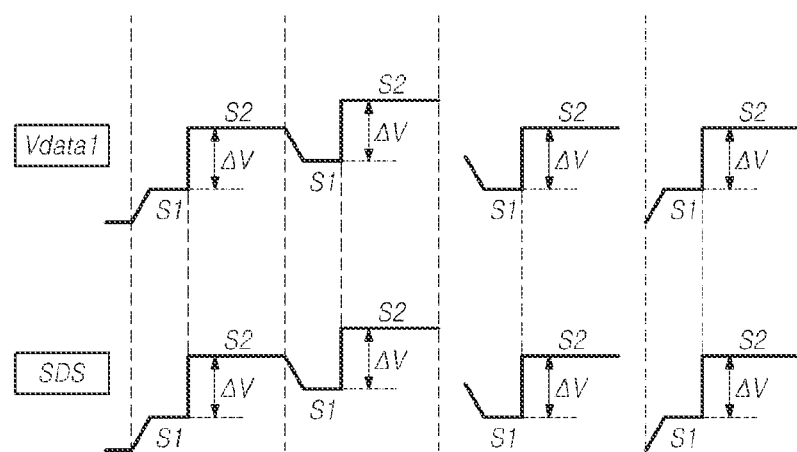
FIG. 16 is a diagram illustrating a shield driving signal supplied to the shield line for improving touch sensitivity in the display device according to one or more embodiments of the present invention.

FIG. 14 is a diagram illustrating components, such as a shield line SHDL for shielding the data line DL and a shield driver 1400, for improving touch sensitivity in the display device 100 according to embodiments, FIG. 15 is a diagram illustrating a structure of the shield line SHDL for improving touch sensitivity in the display device 100 according to embodiments, and FIG. 16 is a diagram illustrating a shield driving signal SDS supplied to the shield line SHDL for improving touch sensitivity in the display device 100 according to embodiments.

Referring to FIG. 14, the display panel 110 can further include a plurality of shield lines SHDL corresponding to the plurality of data lines DL.

The plurality of shield line SHDL can shield the plurality of data lines DL and surrounding conductors located around the plurality of data lines DL.

Here, a surrounding conductor corresponding to one of the data lines DL can be, for example, a gate line GL, another data line DL, or the like, disposed around the corresponding data line DL, or can be any electrode or line having an electrical state different from the video data signal Vdata applied to the corresponding data line DL.

Referring to FIG. 15, a single shield line SHDL can be disposed along and around a corresponding single data line DL. The shield line SHDL can include one or more among a first metal M1 located below the corresponding data line DL, a second metal M2 located next to the corresponding data line DL, and a third metal M3 located above the corresponding data line DL.

Referring to FIG. 14, the simultaneous driving circuit 1130 can further include the shield driver 1400 electrically connected to the plurality of shield lines.

Referring to FIG. 14, the shield driver 1400 can supply the shield driving signal SDS to each of the plurality of shield line SHDL.

Referring to FIG. 14, the shield driver 1400 can include an output buffer BUF including a buffer input port INb through which the shield driving signal SDS is input and a buffer output port OUTb electrically connected to the shield line SHDL. The output buffer BUF can be present for every data line DL.

Alternatively, the shield driver 1400 can be provided in the form of a conducting line, through which the shield driving signal SDS input to the simultaneous driving amplifier SDAMP is delivered to the shield line SHDL.

Referring to FIG. 16, the shield driving signal SDS supplied to each of the plurality of shield lines SHDL can correspond to the video data signal Vdata supplied to the corresponding data line DL.

Referring to FIG. 16, the shield driving signal SDS supplied to each of the plurality of shield line SHDL corresponds to the video data signal Vdata supplied to the corresponding data line DL. This means that the amplitude, phase, frequency, or the like of the shield driving signal SDS corresponds to that of the video data signal Vdata.

In particular, the amplitude, phase, frequency, or the like of the shield driving signal SDS supplied to each of the plurality of shield line SHDL can correspond to that of the second signal segment S2 of the video data signal Vdata supplied to the corresponding data line DL.

Referring to FIG. 16, for example, the shield driving signal SDS supplied to the first shield line among the plurality of shield lines SHDL, corresponding to the first data line DL1, can include a segment, the voltage level of which changes by an amplitude corresponding to the voltage difference ΔV between the first signal segment S1 and the second signal segment S2 of the video data signal Vdata supplied to the first data line DL1.

For example, the shield driving signal SDS supplied to each of the plurality of shield line SHDL can be the same as the video data signal Vdata supplied to the corresponding data line DL.

As described above, during the touch driving, the occurrence of unnecessary parasitic capacitance between the data line DL and the surrounding conductors can be prevented, thereby improving touch sensitivity.

In addition, in the display device 100 according to one or more embodiments, the gate signal GATE supplied to the plurality of gate lines GL can include a segment, the voltage level of which changes by an amplitude corresponding to the voltage difference ΔV between the first signal segment S1 and the second signal segment S2 of the video data signal Vdata.

For example, the gate signal GATE can have a signal waveform serving as a voltage change of the first signal segment S1 and the second signal segment S2 of the video data signal Vdata applied to the corresponding data line DL, on the basis of a basic signal waveform including a signal segment having the turn-on voltage level LEV_ON and a signal segment having the turn-off voltage level LEV_OFF.

As described above, during the touch driving, the occurrence of unnecessary parasitic capacitance between the data line DL and the gate line GL can be prevented, thereby improving touch sensitivity.

Figure 17:
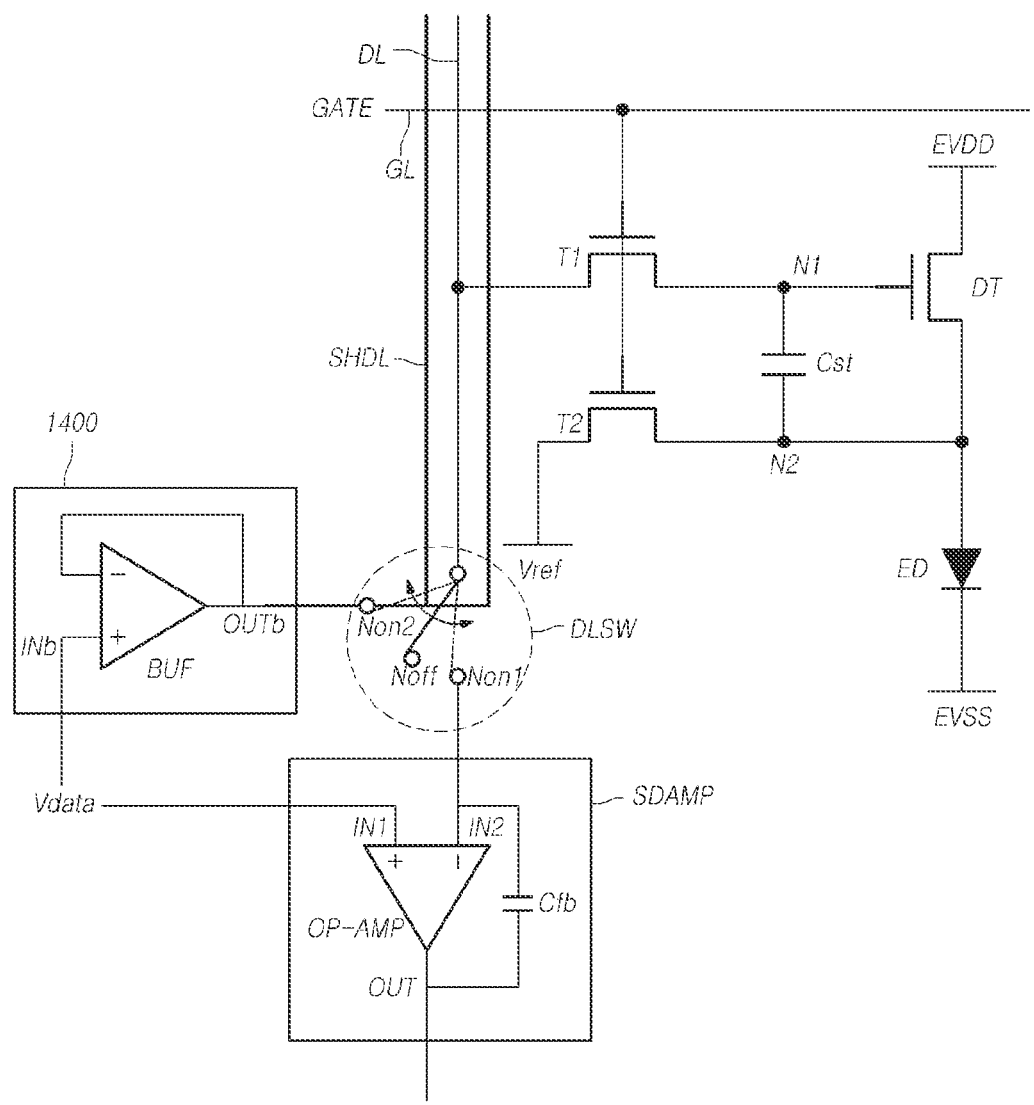
FIG. 17 is a diagram illustrating the simultaneous driving circuit for accurate display driving in case of simultaneous driving of the display device according to one or more embodiments of the present invention.
Figure 18:
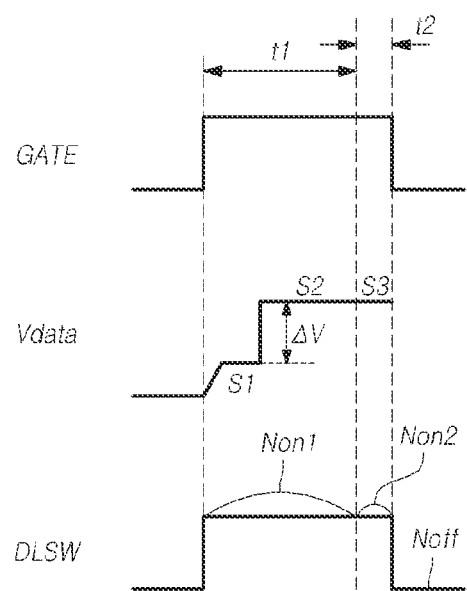
FIG. 18 is a diagram illustrating a video data signal output by two driving elements (i.e., a simultaneous driving amplifier and an output buffer) included in the simultaneous driving circuit for accurate display driving in case of simultaneous driving of the display device according to one or more embodiments of the present invention.

FIG. 17 is a diagram illustrating the simultaneous driving circuit 1130 for accurate display driving in case of simultaneous driving of the display device 100 according to one or more embodiments, and FIG. 18 is a diagram illustrating the video data signal Vdata output by two driving elements (i.e., the simultaneous driving amplifier SDAMP and the output buffer BUF) included in the simultaneous driving circuit 1130 for accurate display driving in case of simultaneous driving of the display device 100 according to embodiments.

Referring to FIG. 17, the simultaneous driving circuit 1130 can further include a plurality of output buffers BUF for supplying the video data signal Vdata to the plurality of data lines DL.

Each of the plurality of output buffer BUF can include the buffer input port INb, through which the video data signal Vdata is input, and the buffer output port OUTb electrically connected to the data line DL.

For example, each of the plurality of output buffer BUF can be implemented as a unit gain buffer (i.e., a unit gain amplifier) to stabilize power of the data line DL.

The data line DL can be electrically connected to the second input port IN2 of the simultaneous driving amplifier SDAMP during a first driving timing period t1, and can be electrically connected to the buffer output port OUTb of the output buffer BUF during a second driving timing period t2 after the first driving timing period t1.

The simultaneous driving circuit 1130 can further include a driving switch element DLSW for selectively connecting one of the output buffer BUF and the simultaneous driving amplifier SDAMP to the data line DL according to the driving timing.

The driving switch element DLSW connects the data line DL to the second input port IN2 of the simultaneous driving amplifier SDAMP during the first driving timing period t1.

The driving switch element DLSW connects the data line DL to the buffer output port OUTb of the output buffer BUF during the second driving timing period t2.

More specifically, referring to FIGS. 17 and 18, the driving switch element DLSW connects the data line DL to a first on-node Non1 or a second on-node Non2 during a period in which the video data signal Vdata is to be supplied to the data line DL.

In addition, the driving switch element DLSW can connect the data line DL to an off-node Noff or connect the data line DL to a first on-node Non1 for the next supply of a video data signal during a period in which the video data signal Vdata is not supplied to the data line DL.

Here, the first on-node Non1 is the second input port IN2 of the simultaneous driving amplifier SDAMP or a node electrically connected to the second input port IN2, while the second on-node Non2 is the output port OUTb of the output buffer BUF or a node electrically connected to the output port OUTb. The off-node Noff can be in an electrically floated state (i.e., a state in which no voltage is applied) or a state in which any control voltage is applied for the touch sensing or the like.

Referring to FIG. 18, during a set horizontal time, the video data signal Vdata can include a first signal segment S1, a second signal segment S2 continuing from the first signal segment S1, and a third signal segment S3 continuing from the second signal segment S2.

There can be no voltage difference between the second signal segment S2 and the third signal segment S3.

In addition, the voltage difference between the second signal segment S2 and the third signal segment S3 can be smaller than the voltage difference ΔV between the first signal segment S1 and the second signal segment S2.

Referring to FIGS. 17 and 18, during the first driving timing period t1, the first signal segment S1 and the second signal segment S2 of the video data signal Vdata can be output to the data line DL through the simultaneous driving amplifiers SDAMP connected to the data line DL by the driving switch element DLSW.

In this regard, referring to FIG. 18, the driving switch element DLSW connects the data line DL to the first on-node Non1 electrically connected to the second input port IN2 of the simultaneous driving amplifiers SDAMP during the first driving timing period t1 of the period in which the video data signal Vdata is to be supplied to the data line DL.

Referring to FIGS. 17 and 18, during the second driving timing period t2, the third signal segment S3 of the video data signal Vdata can be output to the corresponding data line DL through the output buffer BUF connected to the data line DL by the driving switch element DLSW.

In this regard, referring to FIG. 18, the driving switch element DLSW connects the data line DL to the second on-node Non2 electrically connected to the output port OUTb of the output buffer BUF during the second driving timing period t2 of the period in which the video data signal Vdata is to be supplied to the data line DL.

Referring to FIG. 18, after the time periods t1 and t2 in which the video data signal Vdata is to be supplied to the data line DL, the driving switch element DLSW can connect the data line DL to the off-node Noff connected to neither the second input port IN2 of the simultaneous driving amplifier SDAMP nor the output port OUTb of the output buffer BUF.

In addition, after the time periods t1 and t2 in which the video data signal Vdata is to be supplied to the data line DL, the driving switch element DLSW can connect the data line DL to the first on-node Non1 for the next supply of the video data signal.

Referring to FIG. 17, the output buffer BUF can be included in the shield driver 1400.

In a case in which the simultaneous driving amplifier SDAMP able to perform both the voltage supply to the data line DL and the signal reception from the data line DL is used to simultaneously perform the display driving and the touch driving, the video data signal Vdata for the display driving may not be reliably supplied to the data line DL.

As described above, when the plurality of output buffer BUF and the driving using the same are used, the video data signal Vdata for the display driving can be reliably supplied to the data lines DL. For example, the display driving can be reliably and accurately performed by using the plurality of output buffer BUF and the driving using the same.

Figure 19:
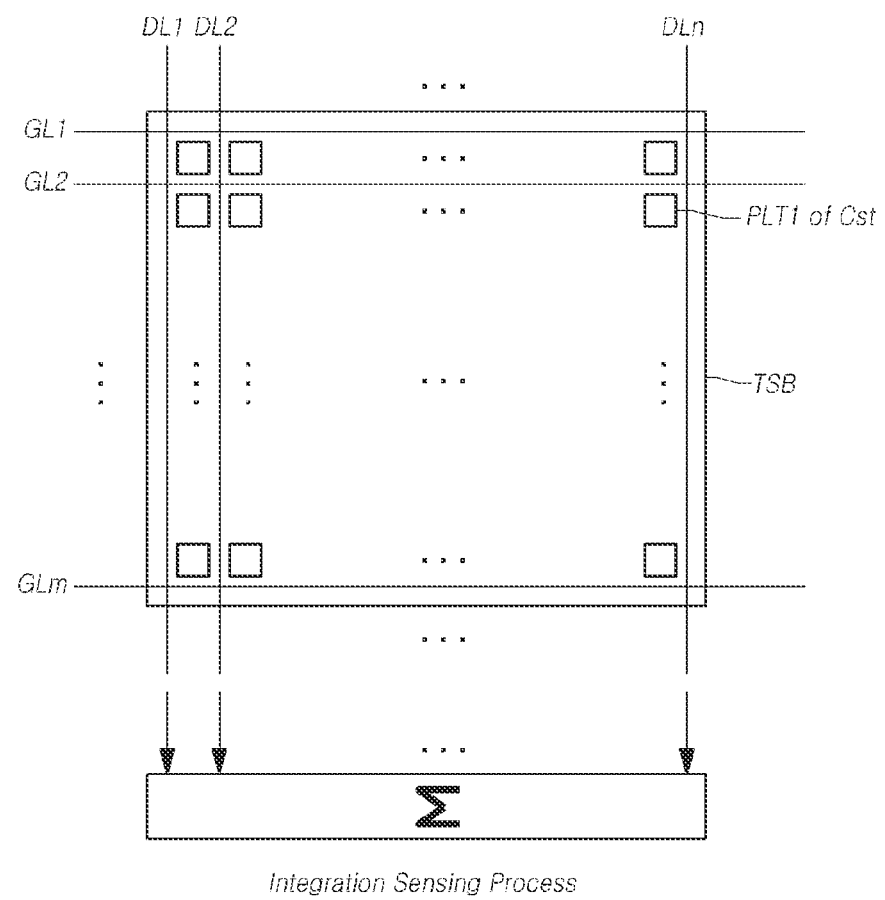
FIG. 19 is a diagram illustrating an integration sensing process for increasing touch sensitivity and touch driving efficiency in case of simultaneous driving of the display device according to one or more embodiments of the present invention.

FIG. 19 is a diagram illustrating an integration sensing process for increasing touch sensitivity and touch driving efficiency in case of simultaneous driving of the display device 100 according to one or more embodiments.

The area of the storage capacitor Cst serving as a touch electrode (or touch sensor) in each of the subpixels SP can be insufficient to generate capacitance Cfinger for the touch sensing.

Accordingly, the display device 100 according to embodiments can provide the integration sensing process to increase touch sensitivity and touch driving efficiency in the simultaneous driving.

In this regard, the display device 100 according to embodiments can manage an area of m×n number of subpixels SP defined by m number of gate lines GL (wherein m is a natural number equal to or greater than 2) and n number of data lines DL (where n is a natural number equal to or greater than 2) as a touch sensor block TSB.

The display device 100 according to embodiments can generate a single piece of readout data on the basis of the sensing signals SS sensed from the single touch sensor block TSB and perform the touch sensing on the basis of the readout data.

Describing in terms of driving, during the period in which the gate signal GATE having the turn-on voltage level is sequentially supplied to each of the m number of gate lines GL among the plurality of gate lines GL, the simultaneous driving circuit 1130 of the data driver 120 can output readout data regarding the single touch sensor block TSB corresponding to the subpixels SP defined by the m number of gate lines GL and the n number of data lines DL, on the basis of the sensing signal SS sensed through each of then number of data lines DL among the plurality of data lines DL.

Before the application of the above-described integration sensing process, a single touch electrode corresponding to a touch sensor can be regarded as the first plate PLT1 of the storage capacitor Cst within a single subpixel SP.

In contrast, in a case in which the above-described integration sensing process is applied, the touch sensor block TSB corresponding to the area of m×n number of the subpixels SP can be regarded as an enlargement of a single touch electrode corresponding to a touch sensor. Accordingly, the capacitance Cfinger for the touch sensing can be increased, thereby improving touch sensitivity.

The single touch sensor block TSB can be an assembly of storage capacitor plates (e.g., PLT1) respectively being one of the first plate PLT1 and the second plate PLT2 of the storage capacitor Cst included in each of the subpixels SP defined by the m number of gate lines GL and the n number of data lines DL.

Figure 20:
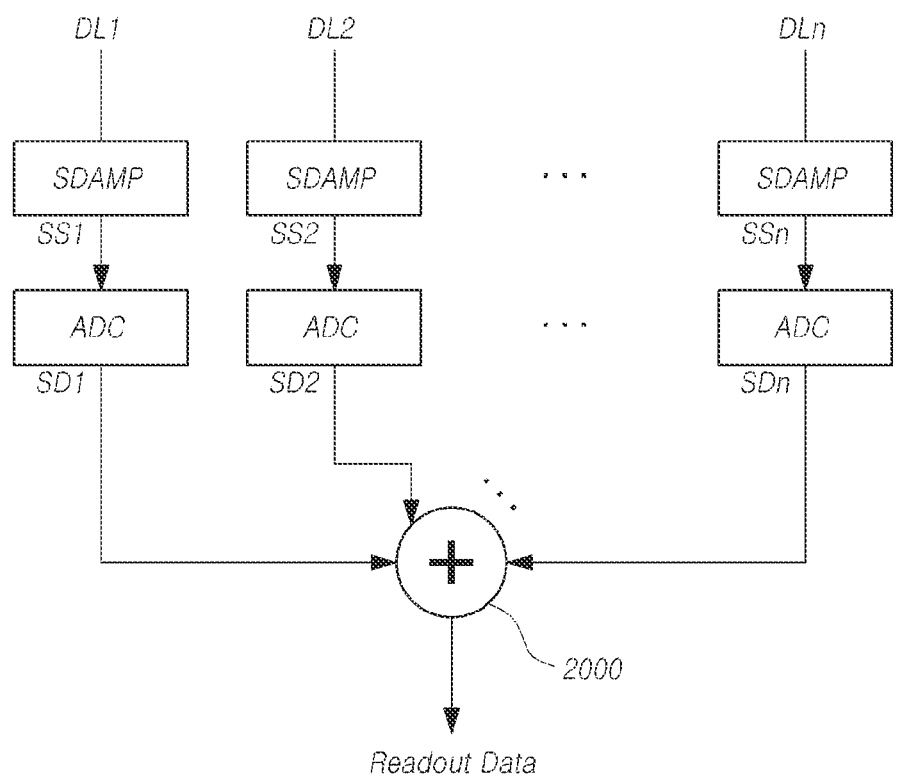
FIG. 20 is an example diagram illustrating the simultaneous driving circuit performing a first integration sensing process to increase touch sensitivity and touch driving efficiency in case of simultaneous driving of the display device according to one or more embodiments of the present invention.

FIG. 20 is an example diagram illustrating the simultaneous driving circuit 1130 performing a first integration sensing process to increase touch sensitivity and touch driving efficiency in case of simultaneous driving of the display device 100 according to one or more embodiments.

Referring to FIG. 20, the first integration sensing process is a process of performing integration processing in the level of digital values.

Referring to FIG. 20, the simultaneous driving circuit 1130 can include a plurality of simultaneous driving amplifiers SDAMP, a plurality of analog-to-digital converters ADC, and an integration circuit 2000 to perform the first integration sensing process. The plurality of simultaneous driving amplifiers SDAMP supply the video data signal Vdata to the n number of data lines DL among the plurality of data lines DL. The plurality of analog-to-digital converters ADC convert sensing signals SS1, SS2, . . . , and SSn, sensed through then number of data lines DL among the plurality of data lines DL by the plurality of simultaneous driving amplifiers SDAMP, into digital sensing values SD1, SD2, . . . , and SDn. The integration circuit 2000 generates readout data regarding the single touch sensor block TSB corresponding to the subpixels SP defined by the m number of gate lines GL and the n number of data lines DL by integrating the sensing values SD1, SD2, . . . , and SDn output from the plurality of analog-to-digital converters ADC, and outputs the readout data.

The simultaneous driving circuit 1130 can further include, for example, at least one of an integrator circuit and a plurality of sample and hold circuits between the plurality of simultaneous driving amplifiers SDAMP and the plurality of analog-to-digital converter ADC.

According to the first integration sensing process as described above, the integration circuit 2000 of the simultaneous driving circuit 1130 can generate a single piece of readout data by performing arithmetic addition (or summing) on the digital sensing values SD1, SD2, . . . , and SDn in the level of digital values. Accordingly, the simultaneous driving circuit 1130 can conveniently perform the integration sensing process in the digital level.

Figure 21:
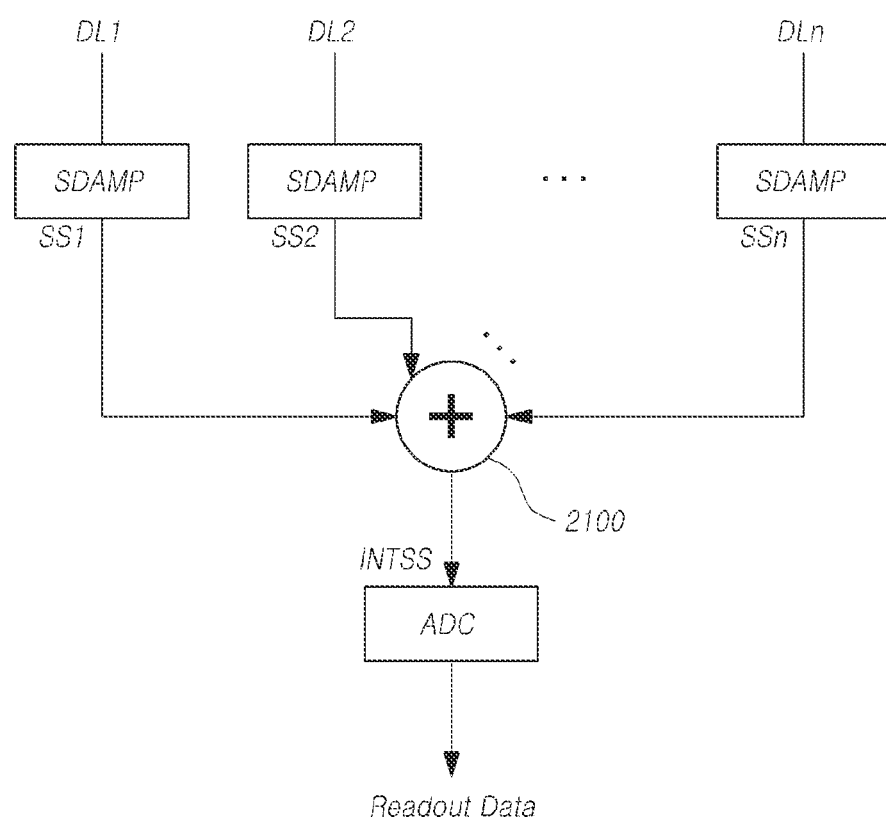
FIG. 21 is an example diagram illustrating the simultaneous driving circuit performing a second integration sensing process to increase touch sensitivity and touch driving efficiency in case of simultaneous driving of the display device according to one or more embodiments of the present invention.
Figure 22:
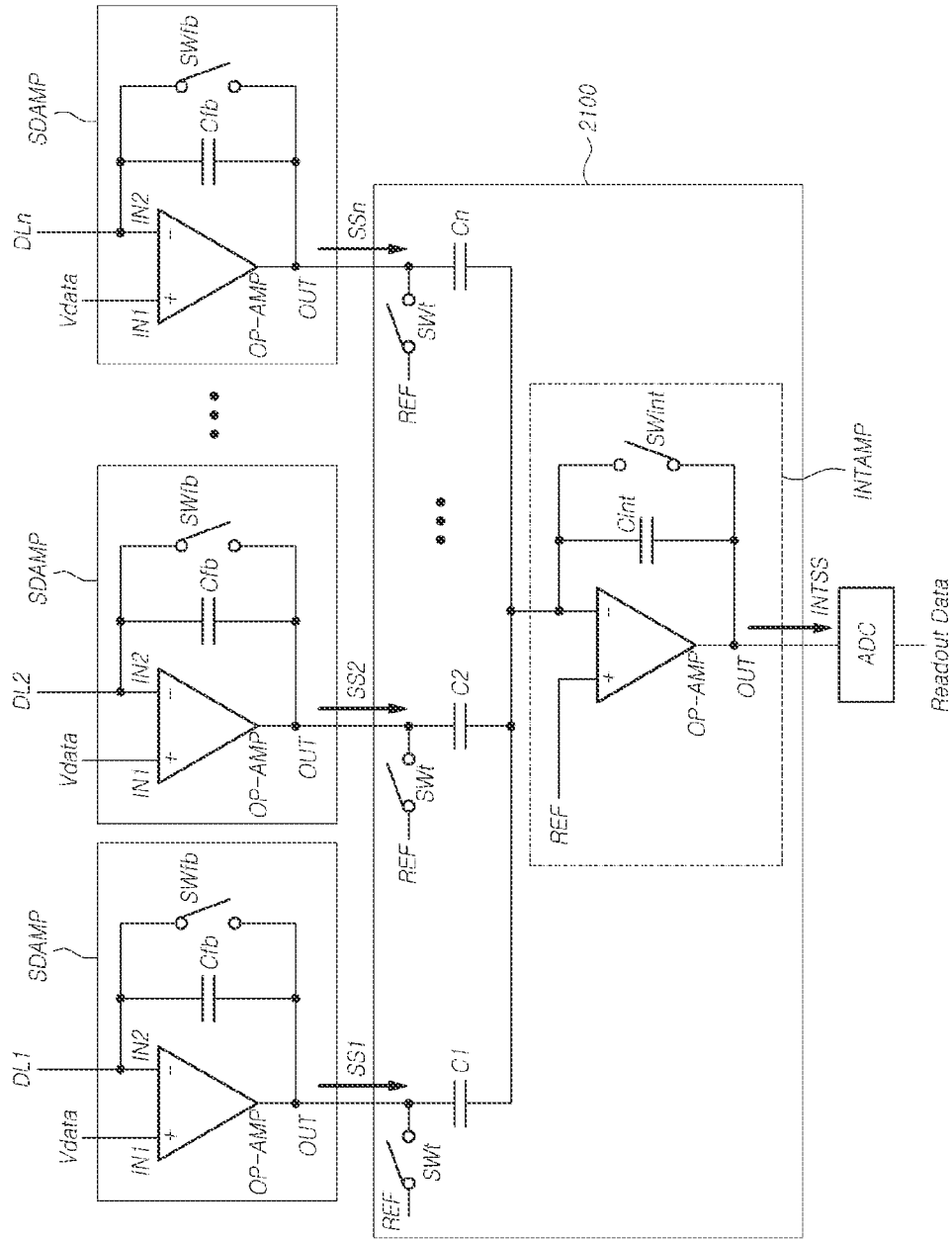
FIG. 22 is a detailed diagram illustrating the simultaneous driving circuit performing the second integration sensing process to increase touch sensitivity and touch driving efficiency in case of simultaneous driving of the display device according to one or more embodiments of the present invention.
Figure 23:
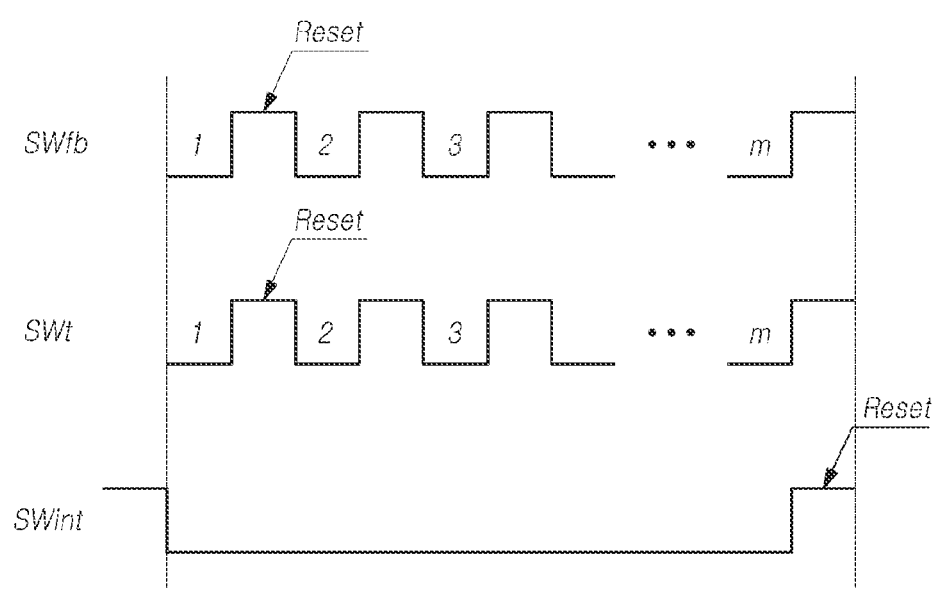
FIG. 23 is a diagram illustrating the operation timing of switch elements in the simultaneous driving circuit.

FIG. 21 is an example diagram illustrating the simultaneous driving circuit 1130 performing a second integration sensing process to increase touch sensitivity and touch driving efficiency in case of simultaneous driving of the display device 100 according to one or more embodiments. FIG. 22 is a detailed diagram illustrating the simultaneous driving circuit 1130 performing the second integration sensing process to increase touch sensitivity and touch driving efficiency in case of simultaneous driving of the display device 100 according to one or more embodiments. FIG. 23 is a diagram illustrating the operation timing of switch elements SWfb, SWt, and SWint in the simultaneous driving circuit 1130.

Referring to FIG. 21, the second integration sensing process is a process of performing the integration processing in the level of analog voltages.

Referring to FIG. 21, the simultaneous driving circuit 1130 can include a plurality of simultaneous driving amplifiers SDAMP, an integration circuit 2100, and an analog-to-digital converter ADC to perform the second integration sensing process. The plurality of simultaneous driving amplifiers SDAMP supply the video data signal Vdata to the n number of data lines DL among the plurality of data lines DL. The integration circuit 2100 outputs an integrated sensing signal INTSS by integrating the sensing signals SS1, SS2, . . . , and SSn sensed through the n number of data lines DL among the plurality of data lines DL by the plurality of simultaneous driving amplifiers SDAMP. The analog-to-digital converter ADC outputs readout data based on the integrated sensing signal INTSS, regarding the single touch sensor block TSB corresponding to the subpixels SP defined by the m number of gate lines GL and the n number of data lines DL.

The simultaneous driving circuit 1130 can further include, for example, at least one of an integrator circuit and a plurality of sample and hold circuits between the plurality of simultaneous driving amplifiers SDAMP and the integration circuit 2100.

According to the second integration sensing process as described above, the integration circuit 2100 of the simultaneous driving circuit 1130 can generate a single piece of readout data by performing integration processing on the sensing signals SS1, SS2, . . . , and SSn, i.e., analog voltages, in the level of analog voltages. Accordingly, the simultaneous driving circuit 1130 can advantageously reduce the number of the analog-to-digital converters ADC.

Referring to FIG. 22, the integration circuit 2100 for the second integration sensing process can include a plurality of delivery capacitors C1, C2, . . . , and Cn and an integrator circuit INTAMP. The plurality of delivery capacitors C1, C2, . . . , and Cn store the sensing signals SS1, SS2, . . . , and SSn, output from the plurality of simultaneous driving amplifiers SDAMP, in the form of electric charges at every set times. The integrator circuit INTAMP cumulatively stores the sensing signals SS1, SS2, . . . , and SSn stored in the plurality of delivery capacitors C1, C2, . . . , and Cn and outputs the integrated sensing signal INTSS.

One end of each of the plurality of delivery capacitors C1, C2, . . . , and Cn is connected to the output port OUT of each of the plurality of simultaneous driving amplifiers SDAMP. The other end of each of the plurality of delivery capacitors C1, C2, . . . , and Cn is connected to the integrator circuit INTAMP.

The integrator circuit INTAMP includes a non-inversion input port+, an inversion input port−, and the output port OUT, as well as an integration capacitor Cint connected to the inversion input port− and the output port OUT.

The non-inversion input port+ of the integrator circuit INTAMP is connected to a reference voltage node REF. The inversion input port− of the integrator circuit INTAMP can be connected to all of the other ends of the plurality of delivery capacitors C1, C2, . . . , and Cn. The output port OUT of the integrator circuit INTAMP can be connected to the analog-to-digital converter ADC.

Referring to FIG. 22, the plurality of simultaneous driving amplifiers SDAMP output the sensing signals SS1, SS2, . . . , and SSn sensed through the plurality of data lines DL1, DL2, . . . , and DLn, respectively, at every set times (e.g., 1H, 2H, or 1.6H). Here, the set time (e.g., 1H, 2H, or 1.6H) can correspond to a time at which each of the m number of gate lines GL is scanned. For example, the set time (e.g., 1H, 2H, or 1.6H) can correspond to the length of the turn-on voltage level of the gate signal GATE applied to each of the m number of gate lines GL.

The feedback capacitor Cfb of each of the plurality of simultaneous driving amplifiers SDAMP should be repeatedly charged and reset at every set times (e.g., 1H, 2H, or 1.6H).

In this regard, a feedback reset switch SWfb can be connected to both ends of the feedback capacitor Cfb of each of the plurality of simultaneous driving amplifiers SDAMP. Due to the feedback reset switch SWfb, the feedback capacitor Cfb can be repeatedly charged (discharged).

The plurality of delivery capacitors C1, C2, . . . , and Cn should be repeatedly charged and reset at every set times (e.g., 1H, 2H, or 1.6H). In this regard, a delivery reset switch SWt can be connected to one end of each of the plurality of delivery capacitors C1, C2, . . . , and Cn.

When the plurality of delivery reset switches SWt are turned off, the electric charges of the feedback capacitors Cfb in the plurality of simultaneous driving amplifiers SDAMP are delivered to the plurality of delivery capacitors C1, C2, . . . , and Cn.

When each of the plurality of delivery reset switches SWt is turned on, each of the plurality of delivery capacitors C1, C2, . . . , and Cn is reset. Here, the reset of each of the plurality of delivery capacitors C1, C2, . . . , and Cn can mean that the electric charge stored in each of the plurality of delivery capacitors C1, C2, . . . , and Cn exits through the reference voltage node REF.

The electric charge, newly stored in each of the plurality of delivery capacitors C1, C2, . . . , and Cn at every set times (e.g., 1H, 2H, or 1.6H), is cumulatively charged in the integration capacitor Cint in the integrator circuit INTAMP.

While all of the m number of gate lines GL are being driven, each of the n number of simultaneous driving amplifiers SDAMP detects the sensing signal through the corresponding data line m times, and each of the n number of delivery capacitors C, C2, . . . , and Cn stores the sensing signal, output to the corresponding simultaneous driving amplifier SDAMP, m times. The integrator circuit INTAMP outputs an integrated sensing signal one time.

The integration capacitor Cint in the integrator circuit INTAMP should be repeatedly charged and reset at every driving times of a single touch sensor block TSB. In this regard, an integration switch SWint for the charging and reset (discharging) of the integration capacitor Cint can be connected to both ends of the integration capacitor Cint.

Referring to FIG. 23, the n number of feedback reset switches SWfb connected to both ends of the feedback capacitors Cfb in the n number of simultaneous driving amplifiers SDAMP and the n number of delivery reset switches SWt connected to the plurality of delivery capacitors C1, C2, . . . , and Cn, to which the electric charges of the feedback capacitors Cfb in the plurality of simultaneous driving amplifiers SDAMP are delivered, can be repeatedly turned on/off at the same times (the same timing).

The on/off periods of the n number of feedback reset switches SWfb and the n number of delivery reset switches SWt correspond to the driving times of the m number of gate lines GL.

For example, while the m number of gate lines GL are being scanned, the n number of feedback reset switches SWfb and the n number of delivery reset switches SWt can be repeatedly turned-off and turned-on m times.

Referring to FIG. 23, while the n number of feedback reset switches SWfb and the n number of delivery reset switches SWt are being repeatedly turned on and off, the integration switch SWint in the integrator circuit INTAMP remains in the turn-off state.

After the completion of the mth turning-off of the n number of feedback reset switches SWfb and the n number of delivery reset switches SWt, the integration switches SWint in the integrator circuit INTAMP can be turned on.

In addition, as described above, the video data signal Vdata for the image display is used as the touch driving signal for the touch sensing, so that the display can be influenced by the touch sensing. A driving timing control method for reducing or removing the effect on the display, which would be caused by simultaneous performance of the display driving and the touch sensing, will be described hereinafter.

Figure 24:
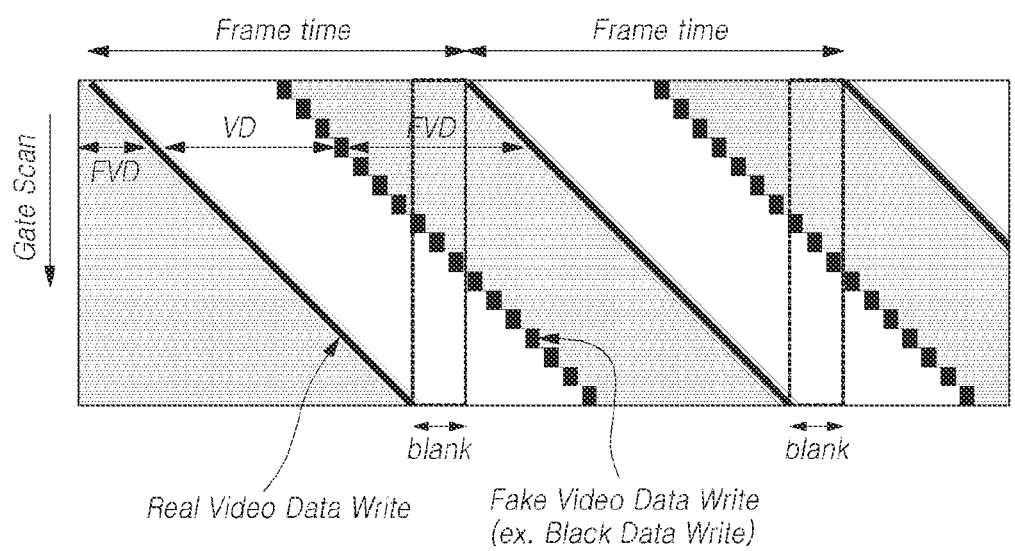
FIG. 24 is a diagram illustrating fake driving for improving the motion picture response time of the display device according to one or more embodiments of the present invention.
Figure 25:
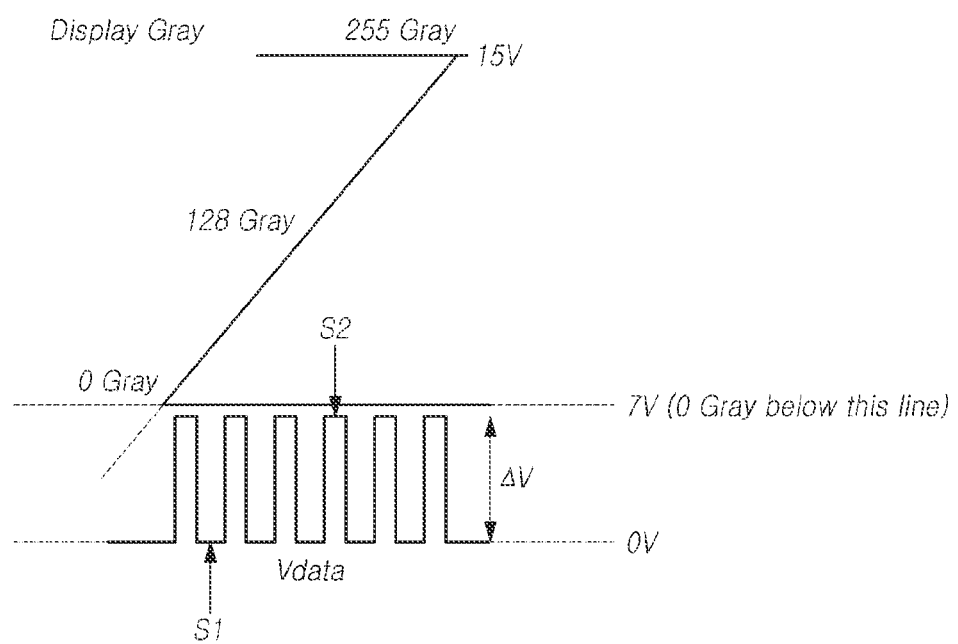
FIG. 25 is a diagram illustrating a video data signal serving as a touch driving signal in a case in which touch driving is performed in association with fake driving for improving the motion picture response time of the display device according to one or more embodiments of the present invention.

FIG. 24 is a diagram illustrating fake driving for improving the motion picture response time (MPRT) of the display device 100 according to one or more embodiments, and FIG. 25 is a diagram illustrating the video data signal Vdata serving as a touch driving signal in a case in which the touch driving is performed in association with the fake driving for improving the MPRT of the display device 100 according to one or more embodiments.

Referring to FIG. 24, the display panel 110 can display a fake video while displaying real videos during a frame time. For example, the frame time can include a real video display segment VD, in which a real video is displayed, and a fake video display segment FVD corresponding to the blank segment blank, in which a fake video different from the real video is displayed.

The real video is a video that the user intends to display.

The fake video is a video different from the real video, and is not a video that the user intends to display.

The fake video is generated internally by the display device 100, irrespective of the user's intention, to improve the MPRT.

The fake video corresponds to a virtual video inserted between real videos. For example, the fake video can be a black video, a low-gray video, or the like.

The data driver 120 can output a fake video data signal corresponding to the fake video to display the fake video different from the real video.

The fake video data signal can correspond to the video data signal Vdata including the first signal segment S1 and the second signal segment S2 having the predetermined voltage difference $\Delta V$.

To display the fake video different from the real video, the data driver 120 writes the fake video data signal in the corresponding subpixel SP by outputting the fake video data signal corresponding to the fake video at a point in time preceding the fake video display segment FVD. This is referred to as fake video insertion driving or black video insertion driving.

The fake video data signal can be supplied to subpixels SP disposed in a single row of subpixels.

In addition, the fake video data signal can be simultaneously supplied to subpixels SP disposed in two or more rows of subpixels.

In this case, when the gate signal GATE having the turn-on voltage level is simultaneously supplied to two or more gate lines GL among the plurality of gate lines GL, the simultaneous driving circuit 1130 in the data driver 120 can simultaneously supply the fake video data signal to subpixels SP included in two or more rows of subpixels corresponding to the two or more gate lines GL.

According to the fake video insertion driving, the fake video data signal can correspond to a low-gray voltage, such as a black data voltage.

For example, in a case in which the gray of a video displayed changes in a range from 0 gray (e.g., 7V) to 255 gray (e.g., 15V), the low gray can be 0 gray, and the low-gray voltage can be 7V.

Accordingly, as illustrated in FIG. 25, the fake video data signal can swing while having the first signal segment S1 and the second signal segment S2 having the predetermined voltage difference $\Delta V$, at a voltage equal to or lower than the low-gray voltage (e.g., a voltage of 0 gray), so that the fake video data signal functions as the touch driving signal for the above-described simultaneous driving.

In this case, the voltage value of the second signal segment S2 of the fake video data signal can be a predetermined voltage value. Thus, the voltage value of the first signal segment S1 having the predetermined voltage difference $\Delta V$ from the voltage value of the second signal segment S2 can be a predetermined voltage value.

For example, in a case in which the touch driving is performed at timings of the fake video insertion driving (e.g., black video insertion driving), the video data signal Vdata corresponding to the fake video data signal (e.g., a black video data signal) can be a pulse signal which swings with an amplitude corresponding to the predetermined voltage difference $\Delta V$ between the first signal segment S1 having a predetermined first voltage value (e.g., 0V) and the second signal segment S2 having a predetermined second voltage value (e.g., a voltage value of 7V or lower).

As described above, the touch sensing can be performed while the display effect is minimized or removed. Accordingly, both the display performance and the touch sensing performance can be improved.

Hereinafter, the driving method of the display device 100 according to one or more embodiments, as described above, will be briefly described again.

Figure 26:
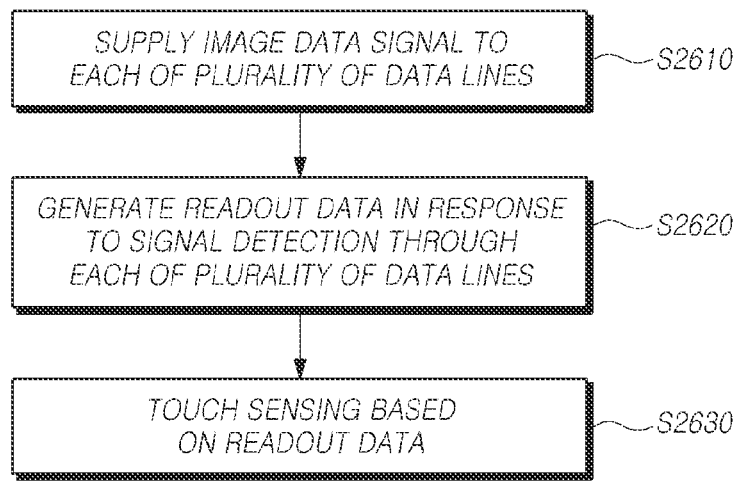
FIG. 26 is a flowchart illustrating a driving method of the display device according to one or more embodiments of the present invention.

FIG. 26 is a flowchart illustrating the driving method of the display device 100 according to one or more embodiments.

Referring to FIG. 26, the driving method of the display device 100 according to one or more embodiments can include operation S2610 of supplying the video data signal Vdata including the first signal segment S1 and the second signal segment S2 maintaining the predetermined voltage difference $\Delta V$ to each of the plurality of data lines DL; operation S2620 of generating readout data in response to signal sensing through each of the plurality of data lines DL to which the video data signal Vdata is supplied; operation S2630 of detecting a touch or determining touch coordinates on the basis of the readout data; and the like.

According to embodiments as set forth above, both the display driving and the touch sensing can be performed even in a case in which a separate touchscreen panel is not provided. Accordingly, the size of the display device 100 can be reduced, and the ease of fabrication of the display device 100 can be increased.

In addition, according to exemplary embodiments, the display driving and the touch sensing can be simultaneously performed. Accordingly, high-resolution images can be displayed, and a sufficient amount of time for the touch sensing can be obtained.

In addition, according to exemplary embodiments, the touch sensing can be performed, even in a case in which a dedicated touch sensor structure is not separately provided.

In addition, according to exemplary embodiments, the touch sensing can be performed using the subpixels designed for the display driving. Accordingly, a process of fabricating dedicated touch sensors in the panel is unnecessary, and the thickness of the panel can be reduced.

In addition, according to exemplary embodiments, the touch driving can be performed using the video data signal intended for the display driving. Accordingly, it is unnecessary to generate a touch driving signal for the touch driving, and a driving operation can be easier.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. For example, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A display device comprising:
   a display panel in which a plurality of data lines and a plurality of gate lines are disposed and a plurality of subpixels are arrayed;
   a data driver configured to supply a video data signal including a first signal segment and a second signal segment maintaining a predetermined voltage difference to each of the plurality of data lines, and output readout data in response to signal sensing through each of the plurality of data lines to which the video data signal is supplied; and
   a touch controller configured to detect a touch or determine touch coordinates in accordance with the readout data,
   wherein each of the plurality of subpixels includes:
   an emitting device including a first electrode, emitting layer, and a second electrode;
   a driving transistor configured to drive the emitting device and including a first node corresponding a gate node, a second node, and a third node;
   a first transistor configured to electrically connect between the first node and a data line among the plurality of data lines; and
   a storage capacitor connected between the first node and the second node, and including a first plate and a second plate,
   wherein the first plate of the storage capacitor is electrically connected to the first node of the driving transistor or a portion corresponding to the first node of the driving transistor, and the second plate is electrically connected to the second node of the driving transistor or a portion corresponding to the second node of the driving transistor, and
   wherein the video data signal as a touch driving signal for touch driving without being carried with a separate touch driving signal is applied to the first plate of the storage capacitor electrically connected to the first node of the driving transistor or corresponding to the first node of the driving transistor.

2. The display device according to claim 1, wherein, even in a case in which a voltage value of each of the first signal segment and the second signal segment supplied to each of the plurality of data lines changes, the voltage difference between the first signal segment and the second signal segment is maintained to be constant.

3. The display device according to claim 1, wherein, during a period in which a gate signal having a turn-on voltage level is sequentially supplied to each of m number of gate lines among the plurality of gate lines, where the m is a natural number equal to or greater than 2,
   the data driver outputs the readout data regarding a single touch sensor block, based on sensing signals sensed through each of n number of data lines among the plurality of subpixels, respectively, where the n is a natural number equal to or greater than 2, the single touch sensor block corresponding to subpixels defined by the m number of gate lines and the n number of data lines, among the plurality of subpixels.

4. The display device according to claim 3, wherein the single touch sensor block is an assembly of storage capacitor plates respectively being one of a first plate and a second plate of a storage capacitor included in each of the subpixels defined by them number of gate lines and the n number of data lines.

5. The display device according to claim 1, wherein the video data signal is a display driving signal for image display, and at the same time, the touch driving signal for touch driving, and
   wherein in the video data signal,
   the second signal segment has a variable voltage representing a gray level for image display,
   the predetermined voltage difference between the first signal segment and the second signal segment is constantly maintained so that the video data signal serves as the touch driving signal for touch sensing, and
   the first signal segment has a variable voltage that changes by the second signal segment and the predetermined voltage difference.

6. The display device according to claim 1, further comprising a channel shield pattern overlapping a channel area of the driving transistor,
   wherein the channel shield pattern is electrically connected to the first plate of the storage capacitor.

7. The display device according to claim 1, further comprising a plurality of shield lines present corresponding to the plurality of data lines to shield the plurality of data lines and surrounding conductors located around the plurality of data lines from each other,
   wherein the data driver supplies a shield driving signal to each of the plurality of shield lines, the shield driving signal corresponding to the video data signal supplied to a corresponding data line among the plurality of data lines.

8. The display device according to claim 3, wherein the gate signal includes a segment, a voltage level of which changes by an amplitude corresponding to the voltage difference between the first signal segment and the second signal segment of the video data signal.

9. The display device according to claim 1, wherein the data driver includes a simultaneous driving circuit driving the plurality of data lines for display driving and sensing the plurality of data lines for touch sensing,
   the simultaneous driving circuit includes a plurality of simultaneous driving amplifiers supplying the video data signal to the plurality of data lines, respectively, and sensing the plurality of data lines, respectively, and
   each of the plurality of simultaneous driving amplifiers includes:
   an operation amplifier including a first input port through which the video data signal is input, a second input port connected to a data line among the plurality of data lines to output the video data signal, input through the first input port, to the data line, and an output port outputting a sensing signal sensed through the data line; and a feedback capacitor electrically connected to the second input port and the output port.

10. The display device according to claim 9, wherein the simultaneous driving circuit further includes a plurality of output buffers supplying the video data signal to the plurality of data lines, respectively, each of the plurality of output buffers includes a buffer input port through which the video data signal is input and a buffer output port electrically connected to the data line, and the data line is electrically connected to the second input port of each of the plurality of simultaneous driving amplifiers during a first driving timing period and is electrically connected to the buffer output port of each of the plurality of output buffers during a second driving timing period after the first driving timing period.

11. The display device according to claim 10, wherein the video data signal includes the first signal segment, the second signal segment continuing from the first signal segment, and a third signal segment continuing from the second signal segment, a voltage difference between the second signal segment and the third signal segment is zero or smaller than the voltage difference between the first signal segment and the second signal segment, the first signal segment and the second signal segment of the video data signal are output to a corresponding data line among the plurality of data lines through a simultaneous driving amplifier among the plurality of simultaneous driving amplifiers during the first driving timing period, and the third signal segment of the video data signal is output to the corresponding data line through a corresponding output buffer among the plurality of output buffers during the second driving timing period of the video data signal.

12. The display device according to claim 1, wherein the display panel displays a fake video while displaying a real video, the data driver outputs the fake video data signal corresponding to the fake video as the video data signal including the first signal segment and the second signal segment having the predetermined voltage difference, and the fake video is a black video or a low-gray video.

13. The display device according to claim 12, wherein the fake video data signal swings while having the first signal segment and the second signal segment having the predetermined voltage difference, at a voltage equal to or lower than a low-gray voltage.

14. The display device according to claim 1, wherein the video data signal includes a first video data signal supplied to a first data line among the plurality of data lines and a second video data signal supplied to a second data line among the plurality of data lines, and wherein a voltage difference between the first signal segment and the second signal segment of the first video data signal Vdata1 and a voltage difference between the first signal segment and the second signal segment of the second video data signal are same or correspond to each other.

15. A data driver for driving a plurality of data lines disposed in a display panel, the data driver comprising:

a latch circuit configured to store video data;

a digital-to-analog converter configured to convert the video data into an analog video signal in a form of an analog voltage; and a simultaneous driving circuit configured to supply a video data signal based on the analog video signal to each of the plurality of data lines, the video data signal including a first signal segment and a second signal segment maintaining a predetermined voltage difference, the simultaneous driving circuit further configured to output readout data in response to signal sensing through each of the plurality of data lines to which the video data signal is supplied, wherein each of a plurality of subpixels in the display panel includes:

an emitting device including a first electrode, emitting layer, and a second electrode;

a driving transistor configured to drive the emitting device and including a first node corresponding a gate node, a second node, and a third node;

a first transistor configured to electrically connect between the first node and a data line among the plurality of data lines; and a storage capacitor electrically connected between the first node and the second node and including a first plate and a second plate, wherein the first plate of the storage capacitor is electrically connected to the first node of the driving transistor or a portion corresponding to the first node of the driving transistor, and the second plate is electrically connected to the second node of the driving transistor or a portion corresponding to the second node of the driving transistor, and wherein the video data signal as a touch driving signal for touch driving without being carried with a separate touch driving signal is applied to the first plate of the storage capacitor electrically connected to the first node of the driving transistor or corresponding to the first node of the driving transistor.

16. The data driver according to claim 15, wherein, even in a case in which a voltage value of each of the first signal segment and the second signal segment supplied to each of the plurality of data lines changes, the voltage difference between the first signal segment and the second signal segment is maintained to be constant.

17. The data driver according to claim 15, wherein, during a period in which a gate signal having a turn-on voltage level is sequentially supplied to each of m number of gate lines among the plurality of gate lines, where the m is a natural number equal to or greater than 2, the simultaneous driving circuit outputs the readout data regarding a single touch sensor block, based on sensing signals sensed through each of n number of data lines among the plurality of data lines, respectively, where the n is a natural number equal to or greater than 2, the single touch sensor block corresponding to subpixels defined by the m number of gate lines and the n number of data lines, among the plurality of subpixels.

18. The data driver according to claim 17, wherein the simultaneous driving circuit includes:

a plurality of simultaneous driving amplifiers supplying the video data signal to the n number of data lines among the plurality of data lines, respectively;

a plurality of analog-to-digital converters converting the sensing signals, sensed through the n number of data lines by the plurality of simultaneous driving amplifiers, to digital sensing values; and an integration circuit generating and outputting readout data regarding the single touch sensor block corresponding to the subpixels defined by the m number of gate lines and the n number of data lines by integrating the sensing values output from the plurality of analog-to-digital converters.

19. The data driver according to claim 17, wherein the simultaneous driving circuit includes:
a plurality of simultaneous driving amplifiers supplying the video data signal to each of the n number of data lines among the plurality of data lines;
an integration circuit outputting an integrated sensing signal by integrating the sensing signals sensed through the n number of data lines among the plurality of data lines by the plurality of simultaneous driving amplifiers; and
an analog-to-digital converter outputting readout data based on the integrated sensing signal, regarding the single touch sensor block corresponding to the subpixels defined by the m number of gate lines and the n number of data lines.

20. The data driver according to claim 15, wherein the simultaneous driving circuit includes a shield driver electrically connected to a plurality of shield lines present corresponding to the plurality of data lines to shield the plurality of data lines and surrounding conductors located around the plurality of data lines from each other, and
wherein the shield driver supplies a shield driving signal to each of the plurality of shield lines, the shield driving signal corresponding to the video data signal supplied to a corresponding data line among the plurality of data lines.

* * * * *